United States Patent
Matsumoto et al.

(10) Patent No.: US 6,879,890 B2
(45) Date of Patent: Apr. 12, 2005

(54) LANE KEEP CONTROL APPARATUS AND METHOD FOR AUTOMOTIVE VEHICLE

(75) Inventors: Shinji Matsumoto, Yokohama (JP); Genpei Naito, Yokohama (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 93 days.

(21) Appl. No.: 10/312,578
(22) PCT Filed: Aug. 9, 2002
(86) PCT No.: PCT/JP02/08155
§ 371 (c)(1), (2), (4) Date: Jan. 15, 2003
(87) PCT Pub. No.: WO03/029908
PCT Pub. Date: Apr. 10, 2003

(65) Prior Publication Data
US 2004/0010371 A1 Jan. 15, 2004

(30) Foreign Application Priority Data
Sep. 28, 2001 (JP) .................................... 2001-304138

(51) Int. Cl.[7] .............................. G08G 1/16; B60T 8/00
(52) U.S. Cl. ........................... 701/23; 701/41; 340/435
(58) Field of Search ............................. 701/23, 41, 70, 701/84, 301; 340/435, 436, 901, 903; 303/146

(56) References Cited

U.S. PATENT DOCUMENTS

| | | | | |
|---|---|---|---|---|
| 5,826,209 A | * | 10/1998 | Matsuno | 701/69 |
| 6,021,367 A | * | 2/2000 | Pilutti et al. | 701/41 |
| 6,057,754 A | * | 5/2000 | Kinoshita et al. | 340/435 |
| 6,059,067 A | * | 5/2000 | Shibahata et al. | 180/338 |
| 6,216,079 B1 | * | 4/2001 | Matsuda | 701/70 |
| 6,282,478 B1 | | 8/2001 | Akita | 701/70 |
| 6,411,901 B1 | * | 6/2002 | Hiwatashi et al. | 701/301 |

FOREIGN PATENT DOCUMENTS

| | | |
|---|---|---|
| EP | 1 074 904 A1 | 2/2001 |
| JP | 11-96497 A | 4/1999 |
| JP | 2001-310719 A | 11/2001 |
| JP | 2002-32125 A | 1/2002 |

OTHER PUBLICATIONS

T. Pilutti, et al., "Vehicle Steering Intervention Through Differential Braking", Proceedings of the American Control Conference, Jun. 1995, pp. 1667–1671.

* cited by examiner

Primary Examiner—Thomas G. Black
Assistant Examiner—Dalena Tran
(74) Attorney, Agent, or Firm—Foley & Lardner LLP

(57) ABSTRACT

In lane keep control apparatus and method for an automotive vehicle, such a determination is made as to whether a tendency of a divergence of the vehicle from a traffic lane on which the vehicle is traveling occurs according to a detected travel state of the vehicle, a driving force controlled variable for each road wheel to develop a yaw moment in a direction in which the divergence of the vehicle from the traffic lane is avoided is calculated in accordance with the detected travel state, the driving force controlled variable of each road wheel is corrected in such a manner that the yaw moment developed in a direction in which the divergence of the vehicle from the traffic lane is avoided is increased in accordance with a history of a control executed to avoid the divergence of the vehicle from the traffic lane.

20 Claims, 15 Drawing Sheets

LANE KEEP CONTROL APPARATUS AND METHOD FOR AUTOMOTIVE VEHICLE

TECHNICAL FIELD

The present invention relates to lane keep control apparatus and method for an automotive vehicle, in which a divergence (or also called, a deviation) of a vehicular travel from a traffic lane is prevented from occurring when the vehicle during a vehicular run on the traffic lane is deviated (or diverged) from the traffic lane.

BACKGROUND ART

A Japanese Patent Application First Publication No. Heisei 11-96497 published on Apr. 9, 1999 exemplifies a previously proposed lane keep control apparatus. In the previously proposed lane keep control apparatus disclosed in the above-described Japanese Patent Application First Publication, when determining that the vehicle tends to be diverged from a traffic lane on which the vehicle is traveling, the previously proposed lane keep control apparatus prevents a divergence of the vehicle from the traffic lane by outputting a steering control torque having a magnitude against which the driver can easily overcome to a steering actuator according to a lateral deviation displacement of a traveling position of the vehicle with respect to a reference position of the traffic lane.

DISCLOSURE OF THE INVENTION

In the previously proposed lane keep control apparatus, the steering actuator is essentially needed. Hence, in order to avoid a use of the steering actuator, it may be considered that a brake force or a drive force of each road wheel is controlled using an anti-skid control system or a drive force control system. Consequently, a travel direction of the vehicle or a travel position thereof may be considered to be controlled by a development of a yaw moment on the vehicle.

However, when the lane keep control apparatus is constructed by controlling the drive force or the brake force of each road wheel of the vehicle, a balanced state between a yaw moment caused by this brake force control or drive force control and that caused by an actual steering operation is continued so that it may become difficult to avoid a deviation (or divergence) tendency of the vehicle from a traffic lane on which the vehicle is traveling. In the similar situation, even if the drive force control or brake force control can once avoid the tendency of the vehicular divergence from the traffic lane due to, for example, a disease or drowsiness of a vehicular driver, a repetitive falling in the tendency of the vehicular divergence from the traffic lane occurs. In such a situation as described above, there is a possibility that the tendency of the divergence of the vehicle from the traffic lane cannot be avoided in terms of a macroscopic point of view.

It is, therefore, an object of the present invention to provide lane keep control apparatus and method for an automotive vehicle which are capable of avoiding the balanced state between the yaw moment developed due to brake or drive force exerted during an execution of the brake or drive force control and that developed due to the steering operation and positively avoiding the tendency of the divergence of the vehicle from the traffic lane even when the tendency of the divergence of the vehicle from the traffic lane is repeated when the divergence of the vehicle from the traffic lane is prevented from occurring by controlling the brake force or drive force of each road wheel of the vehicle.

According to one aspect of the present invention, there is provided a lane keep control apparatus for an automotive vehicle, comprising: a travel state detecting section that detects a travel state of the vehicle; a divergence tendency determining section that determines whether a tendency of a divergence of the vehicle from a traffic lane on which the vehicle is traveling occurs according to the travel state detected by the travel state detecting section; a driving force controlled variable calculating section that calculates a driving force controlled variable for each road wheel to develop a yaw moment in a direction in which the divergence of the vehicle from the traffic lane is avoided in accordance with the travel state detected by the travel state detecting section, the driving force controlled variable calculating section comprising a driving force controlled variable correcting section that corrects the driving force controlled variable of each road wheel in such a manner that the yaw moment developed in a direction in which the divergence of the vehicle from the traffic lane is avoided is increased in accordance with a history of a control executed to avoid the divergence of the vehicle from the traffic lane; and a driving force controlling section that controls a driving force of each road wheel in accordance with the driving force controlled variable calculated by the driving force controlled variable calculating section.

According to another aspect of the present invention, there is provided lane keep control method for an automotive vehicle, comprising: detecting a travel state of the vehicle; determining whether a tendency of a divergence of the vehicle from a traffic lane on which the vehicle is traveling occurs according to the detected travel state; calculating a driving force controlled variable for each road wheel to develop a yaw moment in a direction in which the divergence of the vehicle from the traffic lane is avoided in accordance with the detected travel state; correcting the driving force controlled variable of each road wheel in such a manner that the yaw moment developed in a direction in which the divergence of the vehicle from the traffic lane is avoided is increased in accordance with a history of a control executed to avoid the divergence of the vehicle from the traffic lane; and controlling a driving force of each road wheel in accordance with the corrected driving force controlled variable.

The disclosure of the invention does not necessarily describe all necessary features so that the invention may also be a sub-combination of these described features.

BEST MODE FOR CARRYING OUT THE INVENTION

Reference will hereinafter be made to the drawings in order to facilitate a better understanding of the present invention.

Figure 1:
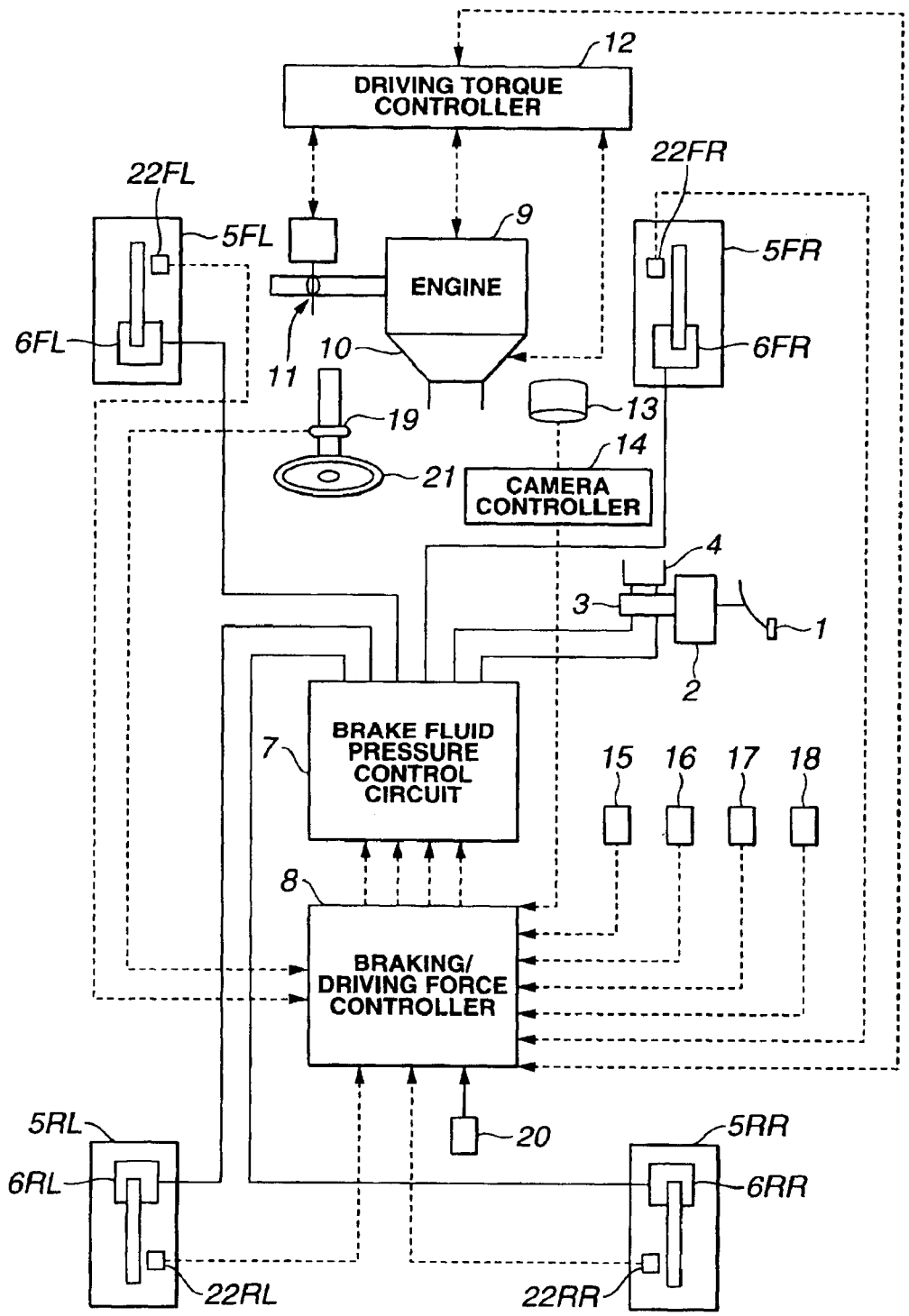
FIG. 1 is a schematic circuit block diagram of an example of an automotive vehicle to which a lane keep control apparatus in a first preferred embodiment according to the present invention is applicable.

FIG. 1 shows a whole functional block diagram of an automotive vehicle to which a lane keep control apparatus in a first preferred embodiment according to the present invention is applicable.

The automotive vehicle shown in FIG. 1 is a rear-wheel drive vehicle on which an automatic transmission and a conventional differential gear are mounted and in which a brake system controls a brake force to be applied to left and right road wheels independently of each other for front and rear road wheels 5FL through 5RR.

The brake system shown in FIG. 1 constitutes a brake pedal 1, a booster 2, and a master cylinder 3, and a reservoir 4. A brake fluid pressure boosted by means of a master cylinder 3 in accordance with a depression depth of brake pedal 1 by a vehicle driver is usually supplied within each wheel cylinder 6FL, 6FR, 6RL, 6RR of each road wheel 5FL, 5FR, 5RL, 5RR. A brake fluid pressure control circuit 7 is interposed between master cylinder 3 and each wheel cylinder 6FL, 6FR, 6RL, 6RR. A brake fluid pressure of each wheel cylinder 6FL, 6FR, 6RL, 6RR can control the brake fluid pressure separately and individually.

Brake fluid pressure control circuit 7 is constituted by a brake fluid pressure control circuit used, for example, for an anti-skid control system or traction control system. In this embodiment, the brake fluid pressure of each wheel cylinder 6FL through 6RR is enabled to be increased or decreased independently of each other. Brake fluid pressure control circuit 7 controls the brake fluid pressure of each wheel cylinder 6FL through 6RR in accordance with the brake fluid pressure of each wheel cylinder 6FL through 6RR in accordance with a brake fluid pressure command value from a braking/driving force controller 8 as will be described later.

In this vehicle, a driving torque controller 12 is installed to control a driving torque for rear left and right road wheels 5RL and 5RR which are driven wheels by controlling a driving state of an engine 9, a selected gear ratio of automatic transmission 10, and an opening angle of an engine throttle valve 11. The driving state of engine 9 can be controlled by controlling, for example, a fuel injection quantity or a timing advance angle of an ignition of combustion engine 9. At the same time, an opening angle of engine throttle valve 11 is controlled so that the engine driving state can be controlled. It is noted that driving torque controller 12 can control driving torque of each of rear left and right road wheels 5RL and 5RR which are driven wheels solely and, when a command value of the driver's generated torque is inputted from braking/driving force controller 8 described above, the drive wheel torque is controlled by referring to a command value of the drive torque.

In this vehicle, an CCD (Charge Coupled Device) camera 13 and a camera controller 14 are installed to serve as an external world recognition sensor to detect a position of the vehicle within a traffic lane for a determination on a traffic lane deviation (divergence) of the vehicle. Camera controller 14 detects a lane marker such as a white line to detect a traffic lane from a video image of a zone of a vehicular forward direction trapped by CCD camera 13 and calculates a yaw angle $\phi$ of the vehicle with respect to the traffic lane, a lateral displacement X from a center of the traffic lane, a radius of curvature $\beta$ of the traffic lane, and a lane width L of the traffic lane.

In addition, in this vehicle, an acceleration sensor 15 to detect a longitudinal acceleration Xg and lateral acceleration Yg developed on the vehicle, a yaw rate sensor 16 to detect a yaw rate $\phi'$ developed on the vehicle, a master cylinder pressure sensor 17 to detect an output pressure of master cylinder 3, viz., so-called, to detect a master cylinder pressure Pm, an accelerator pedal depression (depth) sensor (or accelerator pedal opening angle sensor) 18 to detect a depression depth (manipulated variable) of an accelerator pedal, viz., the accelerator opening angle Acc, a steering angle sensor 19 to detect a steering angle a of a steering wheel 21, road wheel velocity sensors 22FL through 22RR to detect revolution speeds of respective road wheels 5FL through 5RR, viz., so-called, each road wheel velocity Vwi (i=FL, FR, RL, and RR), and a direction indicating switch 20 to detect a direction indicating operation of a direction indicator. These detection signals are outputted to braking/driving force controller 8. In addition, yaw angle $\phi$ of the vehicle with respect to the traffic lane detected by camera controller 14, lateral displacement X from the center of the traffic lane, radius of curvature $\beta$ of the traffic lane, lane width L of the traffic lane, and drive torque Tw controlled by driving torque controller 8. It is noted that, in a case where a directivity (a direction property) of left and right directions as viewed from a top of the vehicle is inherently provided in the travel state data of the detected vehicle, the left direction is, at any more, a positive direction. That is to say, yaw rate $\phi'$, lateral acceleration Yg, steering angle $\delta$, and yaw angle $\phi$ provide positive values when the vehicle turns to left and lateral displacement X provides the positive value when the vehicular position is deviated toward the left direction from the center of the traffic lane.

Next, a logic on an arithmetic processing executed in braking/driving force controller 8 will be described with reference to a flowchart of FIG. 2.

Figure 2:
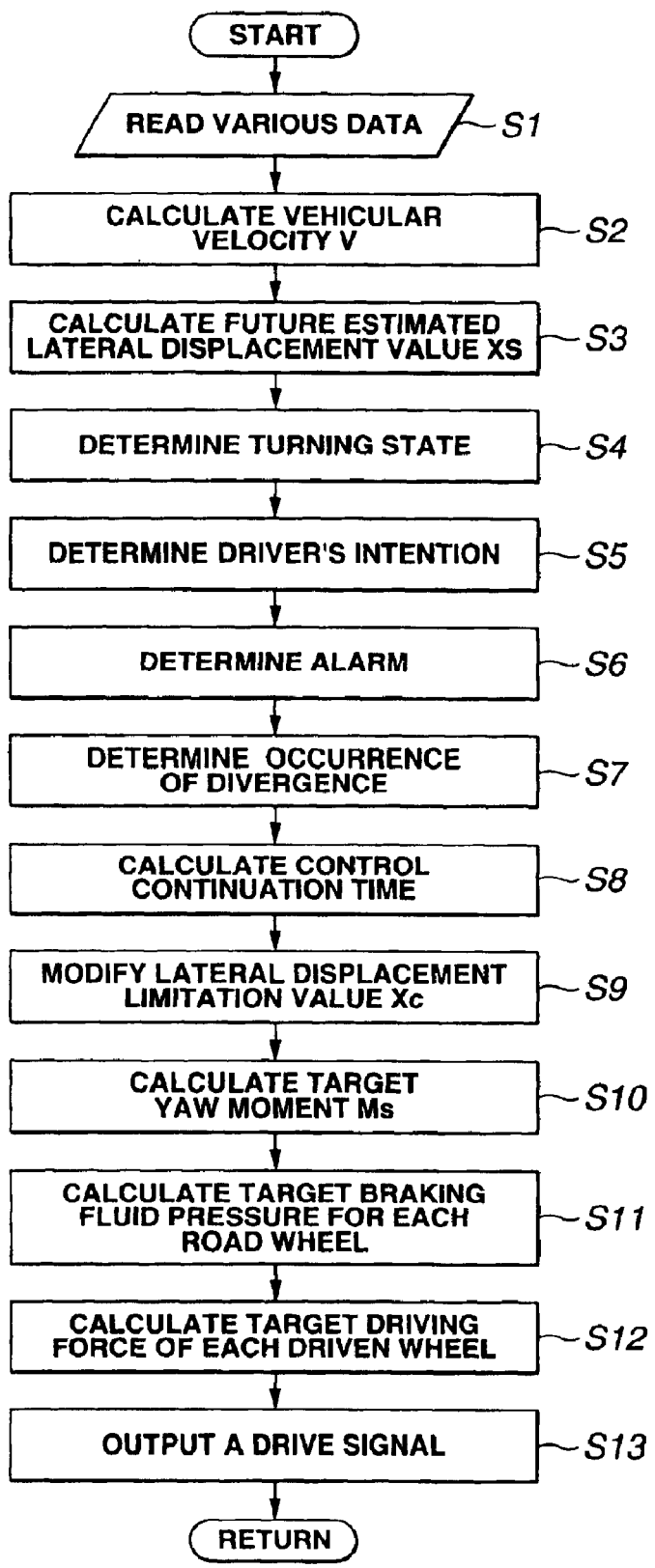
FIG. 2 is an operational flowchart of an arithmetic processing executed in a braking/driving force controller shown in FIG. 1.

The arithmetic processing shown in FIG. 2 is executed as a timer interrupt routine for each predetermined sampling rate ΔT for, for example, each of 10 milliseconds. It is noted that although FIG. 2 does not show a communication step with another arithmetic processing unit, information obtained through the arithmetic processing is updated and stored into a memory at any time and a necessary information is read out from the memory.

That is to say, at a step S1, braking/driving force controller 8 reads various data from respective controllers (control units) and sensors. Specifically, braking/driving force controller 8 reads longitudinal acceleration Xg, lateral acceleration Yg, yaw rate φ', respective road wheel velocities Vwi, accelerator opening angle Acc, master cylinder pressure Pm, steering angle δ, direction indicating switch signal, a drive torque Tw derived from drive torque controller 12, a yaw angle φ of the vehicle with respect to the traffic lane from camera controller 14, a lateral displacement X from the center of the traffic lane, radius of curvature β of the traffic lane on which the vehicle was traveling, and a lane width L of the traffic lane.

At a step S2, braking/driving force controller 8 calculates a traveling velocity V of the vehicle from an average value of front left and right road wheel velocities $V_{wFL}$ and $V_{wFR}$ which are non-driven wheels from among respective road wheel velocities $V_{w}i$ read at step S1.

At a step S3, braking/driving force controller 8 calculates a future estimated lateral displacement value XS as a divergence estimated value. Specifically, future estimated lateral displacement XS is determined in accordance with the following equation (1) using yaw angle φ of the vehicle with respect to the traffic lane, lateral acceleration X of the vehicle from the center of the traffic lane, and radius of curvature β of the traffic lane, these values being read at step S1, and using travel velocity V of the vehicle calculated at step S2.

$$XS = Tt \times V \times (\phi + Tt \times V \times \beta) + X \qquad (1).$$

In equation (1), Tt denotes a headway time used to calculate a forward gazing distance and the forward gazing distance is a multiplication of headway time Tt by travel velocity V of the vehicle. In other words, the lateral displacement estimated value from the center of the traffic lane after the headway time Tt indicates future estimated lateral displacement XS. As will be described later, in the first embodiment, there is a possibility that, if future estimated lateral displacement XS becomes equal to or larger than a predetermined lateral displacement limit value, the vehicle would diverge from a traffic lane of the vehicle or the vehicle has a tendency of diverging from the traffic lane.

Next, at a step S4, braking/driving force controller 8 determines a turning state of the vehicle. Specifically, braking/driving force controller 8 determines that the vehicle is quickly turning when an absolute value of lateral acceleration Xg read at step S1 is equal to or larger than a positive predetermined value $Xg_0$. Then, braking/driving force controller 8 sets a vehicle instability flag $F_{CS}$. In addition, when no quick turning state occurs, braking/driving force controller 8 resets vehicular instability flag $F_{CS}$. In this addition, yaw rate φ' read at step S is compared with a target yaw rate derived from travel velocity V of the vehicle and steering angle δ of the vehicle. Under this state, braking/driving force controller 8 may determine whether a steer state of the vehicle is, so-called, under an over-steer state or an under-steer state and may set vehicle instability flag $F_{CS}$ with these measurement results taken into consideration.

Next, the routine goes to a step S5. At step S5, braking/driving force controller 8 determines a vehicle driver's intention. Specifically, braking/driving force controller 8 determines whether a forward direction (the left direction is positive) of the vehicle determined according to at least one of steering angle σ and direction indicating switch read at step S1 is made coincident with the forward direction of the vehicle (the left direction is positive) determined from a sign (the left direction is positive) of future estimated lateral displacement XS and determines that these forward (vehicular advance) directions are made coincident with each other. At this time, braking/driving force controller 8 determines that an intentional traffic lane change occurs and sets a lane change determination flag $F_{LC}$. If they are not made coincident with each other, braking/driving force controller 8 resets traffic lane change determination flag $F_{LC}$.

At a step S6, braking/driving force controller 8 determines whether a warning should be issued when the vehicle tends to be diverged from the traffic lane. Specifically, the warning is issued when an absolute value of future estimated lateral displacement |XS| as the divergence estimated value calculated at step S3 is equal to or larger than a lateral displacement limit value Xc set in accordance with a control continuation time as will be described later. In the other case, no warning (no alarming) is issued. It is noted that a slight margin may be provided between absolute value |XS| of the estimated lateral displacement and lateral displacement limit value Xc. In addition, a hysteresis loop may be provided in threshold value to prevent a hunting of the warning.

At a step S7, braking/driving force controller 8 determines whether the vehicle tends to be diverged from the traffic lane on which the vehicle is traveling. Specifically, braking/driving force controller 8 determines whether absolute value |XS| of the future estimated lateral displacement as the divergence estimated value calculated at step S3 is equal to or larger than lateral displacement limit value Xc set in accordance with the control continuation time as will be described later. If braking/driving force controller 8 determines that absolute value |XS| of the future estimated lateral displacement as the divergence estimated value calculated at step S3 is equal to or larger than lateral displacement limit value Xc, braking/driving force controller 8 determines that the vehicle has the tendency of diverging from the traffic lane and sets a divergence determination flag $F_{LD}$. If not so, braking/driving force controller 8 determines that the vehicle has no tendency of diverging from the traffic lane and resets divergence determination flag $F_{LD}$. It is noted that, if a vehicle instability flag $F_{US}$ set at step S4 is in the set state, or traffic lane change determination flag $F_{LC}$ set at step S5 is in the set state, the lane keep control is executed. Hence, in this case, divergence determination flag $F_{LD}$ is reset even if absolute value |XS| of the future estimated lateral displacement is equal to or larger than a lateral displacement limit value Xc.

At the next step S8, braking/driving force controller 8 calculates a continuation time of the lane keep control. Specifically, braking/driving force controller 8 increments a timer while, at step S7, divergence determination flag $F_{LD}$ is set. A predetermined sampling period of ΔT of the timer interrupt routine is multiplied by a count value of the timer to determine a traffic lane keep control continuation time Tcc. It is noted that a timer is also cleared when divergence determination flag $F_{LD}$ is reset.

Figure 3:
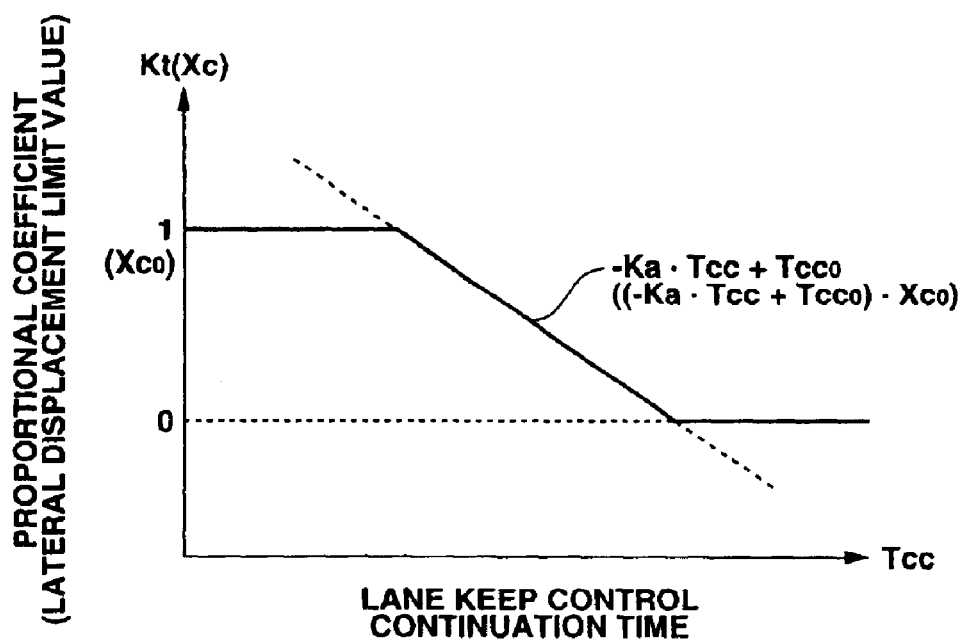
FIG. 3 is a control map used in the arithmetic processing shown in FIG. 2.

At the next step S9, braking/driving force controller 8 executes a modification of lateral displacement limit value Xc described above. Specifically, braking/driving force controller 8 sets a proportional coefficient Kt which is gradually decreased together with an increase in traffic lane keep control continuation time Tcc. This proportional coefficient Kt includes, as shown in FIG. 3, a value on a straight line having an intercept $T_{CC0}$ when lane keep control continuation time Tcc is at a "0" and a gradient of $-Ka$ and which is decreased as lane keep control continuation time Tcc is increased and an intermediate value between a maximum value of "1" and a minimum value of "0". On the other hand, a value subtracting a half value of a vehicular width $L_0$ of the vehicle from a half value of a traffic lane width L is set as a lateral displacement limit value initial value $X_{C0}$. A value of lateral displacement limit value initial value $X_{c0}$ multiplied with proportional coefficient Kt provides lateral displacement limit value Xc. Hence, lateral displacement limit value Xc is gradually decreased together with an increase in lane keep control continuation time Tcc with lateral displacement limit value initial value $X_{c0}$ as a maximum initial value in the same manner as proportional coefficient Kt shown in FIG. 3.

Next, at a step S10, braking/driving force controller 8 calculates and sets a target yaw moment. At step S10, target yaw moment Ms is set only when lane keep determination flag $F_{LD}$ is set. Hence, when divergence determination flag $F_{LD}$ is set, braking/driving force controller 8 calculates target yaw moment Ms in accordance with the following two equations using proportional coefficient Kt determined from vehicle specifications, future estimated lateral displacement XS calculated at step S3, and lateral displacement limit value Xc set at step S9:

$$Ms = -K_1 \times K_2 \times (XS - Xc) \tag{2}$$

It is noted that when lane keep determination flag $F_{LD}$ is in the reset state, target yaw moment Ms is set to "0".

Next, at a step S11, braking/driving force controller 8 calculates a target brake fluid pressure Psi for each road wheel. Suppose that a rear road wheel purpose master cylinder pressure based on front-and-rear brake force distribution with respect to master cylinder Pm read at step S1 is $Pm_R$. At this time, divergence determination flag $F_{LD}$ is reset. At this time, target brake fluid pressures $P_{SFL}$ and $P_{SFR}$ to wheel cylinders 6FL and 6FR of left and right road wheels 5FL and 5FR provide master cylinder pressure Pm when divergence determination flag $F_{LD}$ is reset. Target brake fluid pressures $P_{SRL}$ and $P_{SRR}$ to wheel cylinders 6RL and 6RR of rear left and right road wheels 5RL and 5RR are rear wheel purpose master cylinder pressure $P_{mR}$.

On the other hand, even when divergence determination flag $F_{LD}$ is set, the distribution of the braking force of each road wheel is varied in accordance with a magnitude of target yaw moment Ms calculated at step S10. That is to say, even when divergence determination flag $F_{LD}$ is set, the distribution of the braking force of each road wheel is varied in accordance with a magnitude of target yaw moment Ms calculated at step S10. In details, if absolute value |Ms| of the target yaw moment is smaller than a predetermined value $M_{SO}$, the difference is developed in the braking force between the rear left and right road wheels. If an absolute value |Ms| of the target yaw moment is equal to or larger than predetermined value $M_{SO}$, the difference in the individual braking forces is developed between front and rear left and right road wheels. Hence, a difference $\Delta P_{SF}$ in target brake fluid pressure of front left and right road wheels is "0" when absolute value |Ms| of the target yaw moment is smaller than predetermined value $M_{SO}$. A target brake fluid pressure difference $\Delta P_{SR}$ of rear left and right road wheels is given in the following equation (3). In the similar way, a difference $\Delta P_{SR}$ in a target brake fluid pressure of the front left and right road wheels when absolute value |Ms| of the target yaw moment is equal to or larger than a predetermined value $M_{SO}$ is given in the following equation (4). A difference $\Delta P_{SR}$ in a target brake fluid pressure of the rear left and right road wheels 5RL and 5RR is given in the following equation (5). It is noted that T in the equations (3) through (5) denotes a tread (which is the same between the front and rear road wheels) and $K_{bF}$ and $K_{bR}$ denotes conversion coefficients for the braking force to be converted into the brake fluid pressure and are determined according to the specifications on the brake system.

$$\Delta P_{SR} = 2 \times K_{bR} \times |Ms|/T \tag{3}$$

$$\Delta P_{SF} = 2 \times K_{bF} \times (|Ms| - M_{SO})/T \tag{4}$$

$$\Delta P_{SR} = 2 \times K_{bR} \times |Ms_0|/T \tag{5}$$

Hence, target brake fluid pressure Psi to each wheel cylinder 6FL, 6FR, 6RL, and 6RR when target yaw moment Ms indicates negative values, viz., the vehicle is about to be diverged from the traffic lane is given in the following equations of (6).

$$PS_{FL} = Pm$$

$$PS_{FR} = Pm + \Delta P_{SF}$$

$$PS_{RL} = Pm$$

$$PS_{RR} = Pm + \Delta P_{SR} \tag{6}$$

On the other hand, target brake fluid pressure Psi to each wheel cylinder 6FL, 6FR, 6RL, and 6RR when target yaw moment Ms indicates a positive value, viz., when the vehicle is about to be diverged from the traffic lane in the right direction as viewed from the top of the vehicle is given in the following equations of (7).

$$PS_{FL} = Pm + \Delta P_{SF}$$

$$PS_{FR} = Pm$$

$$PS_{RL} = Pm + \Delta P_{SR}$$

$$PS_{RR} = Pm \tag{7}$$

At the next step S12, braking/driving force controller 8 calculates a target drive force of the driven wheels. In this embodiment, divergence determination flag $F_{LD}$ is set. While the lane keep control is executed, the vehicle is not accelerated due to a throttling of the output of engine 9 even though the accelerator manipulation is carried out. Hence, target drive torque $Trq_{DS}$ when divergence determination flag $F_{LD}$ is set is a value of subtracting a value in accordance with a sum of differences of target brake fluid pressures $\Delta P_{SF}$ and $\Delta P_{SR}$ of the front and rear road wheels from a value in accordance with the accelerator opening angle Acc read at step S1. That is to say, the value in accordance with accelerator opening angle Acc is the drive torque by which the vehicle is accelerated in accordance with the accelerator opening angle. Hence, divergence determination flag $F_{LD}$ is set and, when the lane keep control is carried out, an engine torque is reduced by the brake torque generated by the sum of differences in target fluid pressures $\Delta P_{SF}$ and $\Delta P_{SR}$. It is noted that target drive torque $Trq_{DS}$ when divergence determination flag $F_{LD}$ is reset corresponds only to drive torque by which the vehicle is accelerated in accordance with the accelerator opening angle Acc.

Next, the routine goes to a step S13. At step S13, target brake fluid pressure of each road wheel calculated at step S11 is outputted to brake fluid pressure control circuit 7 and the target drive torque of each drive wheel calculated at step S12 is outputted toward brake fluid pressure control circuit 7. At the same time, the target drive torque of the driven wheels calculated at step S12 is outputted toward drive torque controller 12 and the routine is returned to the main program.

In this routine, when the vehicle is not in an abrupt turn state, no intentional traffic lane change of the driver occurs, and future estimated lateral displacement XS is equal to or larger than lateral displacement limit value Xc, divergence determination flag $F_{LD}$ is set since the vehicle is determined to tend to be diverged from the traffic lane, target yaw moment $M_B$ is calculated on the basis of the difference between the future estimated lateral displacement XS and lateral displacement limit value Xc, and the brake force of each road wheel to achieve target yaw moment Ms.

Thus, when, for example, a steering input is small, a yaw moment to prevent the divergence of the traffic lane is developed so as to prevent this divergence and the traveling velocity of the vehicle is decelerated due to the braking force. Hence, a safe prevention of the divergence of the vehicle from the traffic lane can be achieved. In addition, while the lane keep control is executed, the output torque of engine 9 is reduced so that traveling speed V of the vehicle is decreased. It is possible to prevent the divergence of the vehicle from the traffic lane more safely.

Figure 5A:
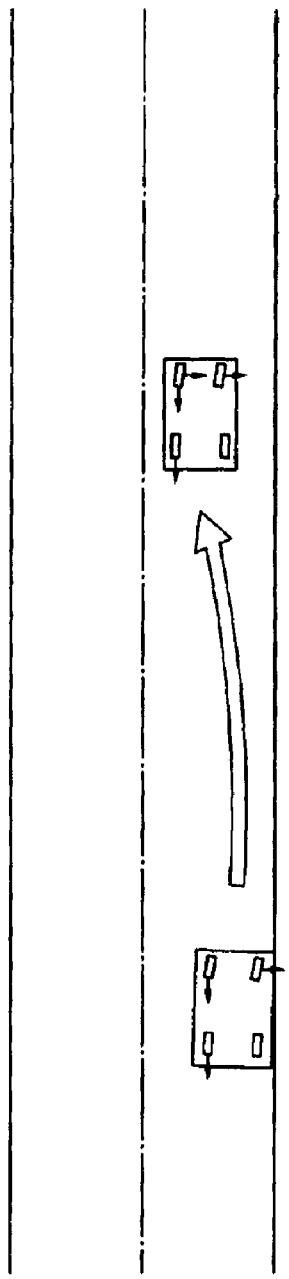
FIGS. 5A and 5B are explanatory views for explaining an action of the vehicle as a result of the arithmetic processing shown in FIG. 2.
Figure 5B:
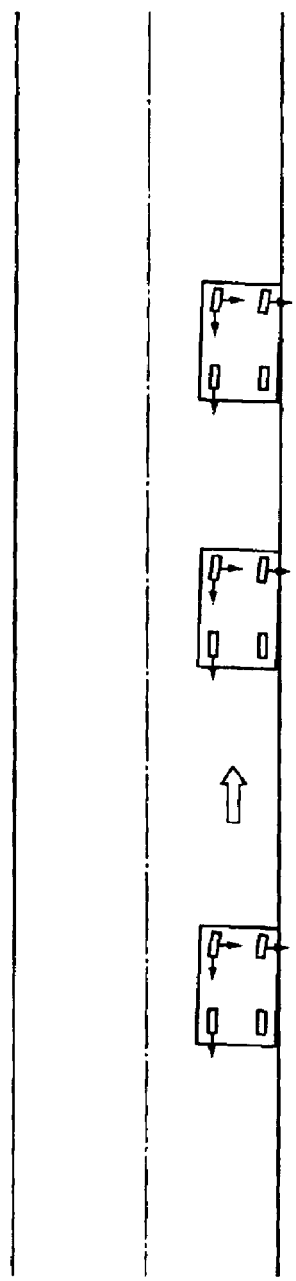

In addition, in this embodiment, if an elapse time from a time at which the lane keep control is started becomes long, lateral displacement limit value Xc becomes gradually small. Consequently, target yaw moment Ms becomes gradually large. Therefore, in a case where the yaw moment due to the steering input as shown in FIG. 5A becomes balanced to a target yaw moment at the initial stage, it is possible to prevent the divergence of the vehicle from the traffic lane by returning the vehicle to a center of the traffic lane as the time has elapsed. FIG. 5B shows a balanced state between the yaw moment due to the steering input and an initial stage target yaw moment and shows a state in which the tendency of the divergence of the vehicle from the traffic lane cannot be avoided due to no gradual increase in the target yaw moment.

As described above, each sensor shown in FIG. 1, camera controller 14, and step S1 shown in FIG. 2 corresponds to travel state detecting means (section). Step S7 shown in FIG. 2 corresponds to divergence determining means (section). Steps S11 and S12 shown in FIG. 2 correspond to braking/driving (driving) force controlled variable calculating means (section). Brake fluid pressure control circuit 7 and driving torque controller 12 constitute braking/driving force controlling means (section). Steps S8 through S10 shown in FIG. 2 constitute braking/driving force (driving force) controlled variable correcting means (section).

Next, a second preferred embodiment of the lane keep control apparatus according to the present invention will be described below. A rough configuration of the vehicle is generally the same as described in the first embodiment. However, in the second embodiment, the arithmetic processing executed in the braking/driving force controller 8 is changed from FIG. 2 related in the first embodiment to FIG. 6 related to the second embodiment.

Figure 6:
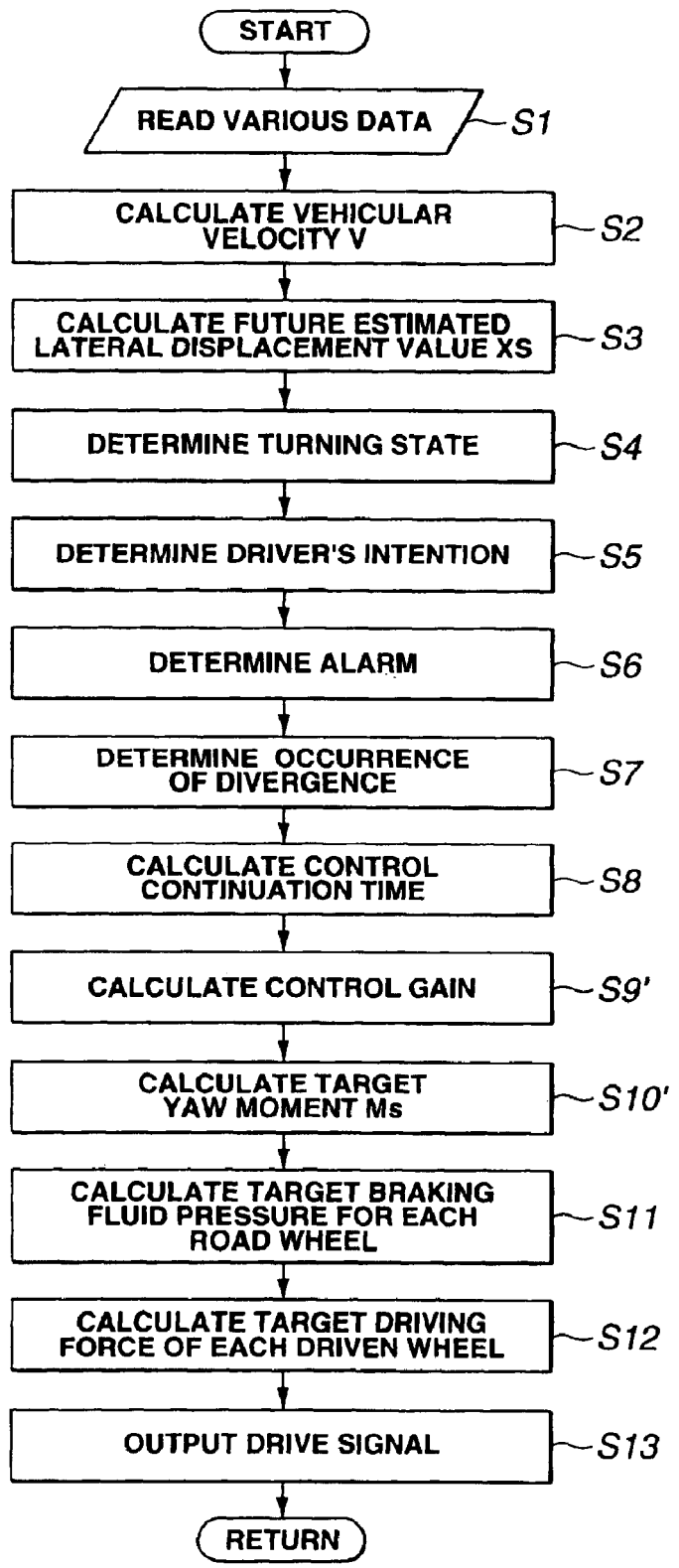
FIG. 6 is an operational flowchart of another arithmetic processing executed in the braking/driving force controller shown in FIG. 1 in a case of the lane keep control apparatus according to the present invention.
Figure 7:
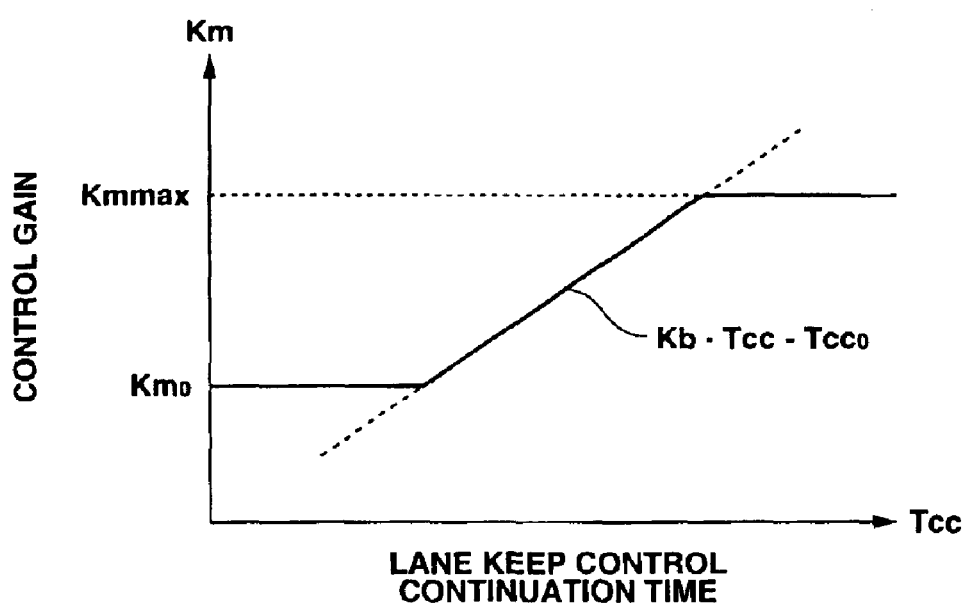
FIG. 7 is another control map used in the arithmetic processing shown in FIG. 2.

It is noted that the same step numbers as those shown in FIG. 2 have the same processing contents as those shown in FIG. 6 and the detailed explanations thereof will be omitted herein. Step S9 shown in FIG. 2 is changed to a step S9' shown in FIG. 6. Step S10 is changed to a step S10'. It is noted that, since lateral displacement limit value Xc is not changed, lateral displacement limit value initial value $X_{C0}$ may be used directly as lateral displacement limit value Xc. At step S9', braking/driving force controller 8 calculates a control gain Km used to calculate target yaw moment Ms. Control gain Km. Control gain Km includes, as shown in FIG. 7, a value on a straight line which increases together with an increase in lane keep control continuation time Tcc having an intercept –Tcc and a gradient of Kb when lane keep control continuation time Tcc is at "0" and an intermediate value between maximum value of $Km_{MAX}$ and a minimum value of $Km_0$.

Figure 4:
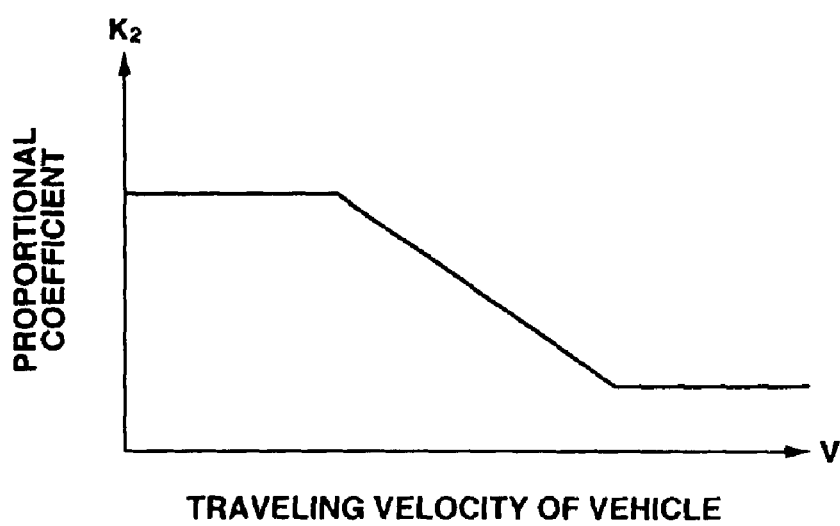
FIG. 4 is another control map used in the arithmetic processing shown in FIG. 2.

At step S10', braking/driving force controller 8 calculates target yaw moment Ms. Specifically, braking/driving force controller 8 multiplies target yaw moment Ms calculated in the first embodiment with control gain Km to provide a new target yaw moment Ms. In addition, target yaw moment Ms is set only when divergence determination flag $F_{LD}$ is set. Hence, when divergence determination flag $F_{LD}$ is set, control gain Km calculated at step S9', proportional coefficient $K_1$ determined according to a vehicular specification, proportional coefficient $K_2$ set in accordance with vehicular traveling velocity V shown in FIG. 4, future estimated lateral displacement XS calculated at step S3, and lateral displacement limit value Xc are used and target yaw moment Ms is calculated in accordance with the following equation (8).

$$Ms = -Km \times K_1 \times K_2 \times (XS - Xc) \tag{8}$$

It is noted that when divergence determination flag $F_{LD}$ is in the reset state, target yaw moment Ms is set to "0".

According to the arithmetic processing shown in FIG. 6, if the vehicle is traveling not in the abrupt turning state, no intentional traffic lane change of the driver occurs, and future estimated lateral displacement XS is equal to or larger than lateral displacement limit value Xc, divergence determination flag $F_{LD}$ is set determining that the vehicle has the tendency of the divergence of the vehicle from the traffic lane, target yaw moment Ms is calculated on the basis of a difference between future estimated lateral displacement XS and lateral displacement limit value Xc, and the braking force of each road wheel is controlled so as to achieve target yaw moment Ms. According to this, for example, when the steering input is small, the yaw moment is developed to prevent the vehicle from being diverged from the traffic lane. In addition, since the brake force causes the vehicular travel velocity to be decreased, it is possible to prevent a more safely the vehicular divergence from the traffic lane. In this embodiment, since, while the lane keep control is executed, the engine output torque is reduced so that traveling velocity V of the vehicle is reduced. It is possible to present the vehicle from being diverged from the traffic lane more safely.

In this embodiment, when an elapse time from a time at which the lane keep control is started becomes long, control gain Km becomes gradually enlarged. Hence, in the same way as described in the first embodiment, in a case where the yaw moment due to the steering input shown in FIG. 5A is balanced from the target yaw moment at the initial stage, the vehicle is gradually returned to the center of the traffic lane as the time is elapsed so that it is possible to prevent an occurrence of divergence of the vehicle from the traffic lane.

As described above, each sensor shown in FIG. 1, camera controller 14, and step S1 shown in FIG. 6 constitute travel state detecting means (section) according to the present invention. Step S7 shown in FIG. 6 constitutes divergence determining means (section). Steps S11 and S12 constitute braking/driving (driving) force controlled variable calculating means (section). Brake fluid pressure control circuit 7 and driving torque controller 12 constitute braking/driving force controlling means (section). Steps S8 through S10' shown in FIG. 6 constitute braking/driving (driving) force controlled variable correcting means (section).

Next, a third preferred embodiment of the lane keep control apparatus according to the present invention will be described below.

Figure 8:
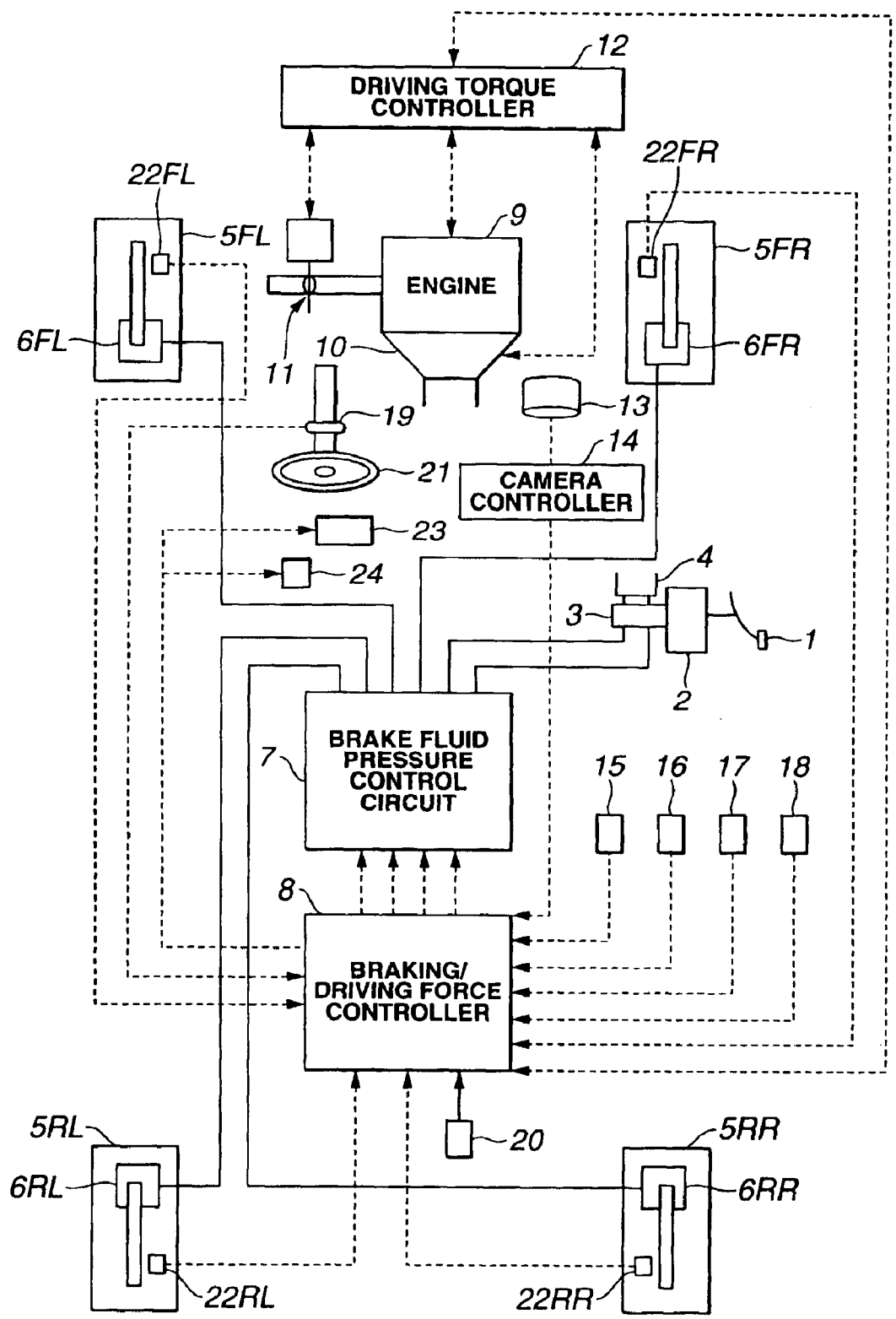
FIG. 8 is a schematic circuit block diagram of another example of the automotive vehicle to which the lane keep control apparatus in a third embodiment according to the present invention is applicable.

FIG. 8 shows a schematic block diagram of the lane keep control apparatus in the third preferred embodiment according to the present invention. As shown in FIG. 8, the lane keep control apparatus in the third embodiment includes, in addition to each component described in the first embodiment and shown in FIG. 1, a vehicular information display device 23 having a display and speaker to produce the content of lane keep control to vehicular occupants and external vehicle information producing device 24 for the vehicle to produce the content of the lane keep control to an external to the vehicle. The other structures on respective components are the same as those described in the first embodiment shown in FIG. 1. The arithmetic processing executed by braking/driving force controller 8 is shown by a flowchart of FIG. 9. In the arithmetic processing shown in FIG. 9, the same step numbers as those shown in FIG. 2 are present but a basic structure of the lane keep control is different from the flowchart shown in FIG. 2. Hence, the contents of the same step numbers as those shown in FIG. 2 will also be described below.

Figure 9:
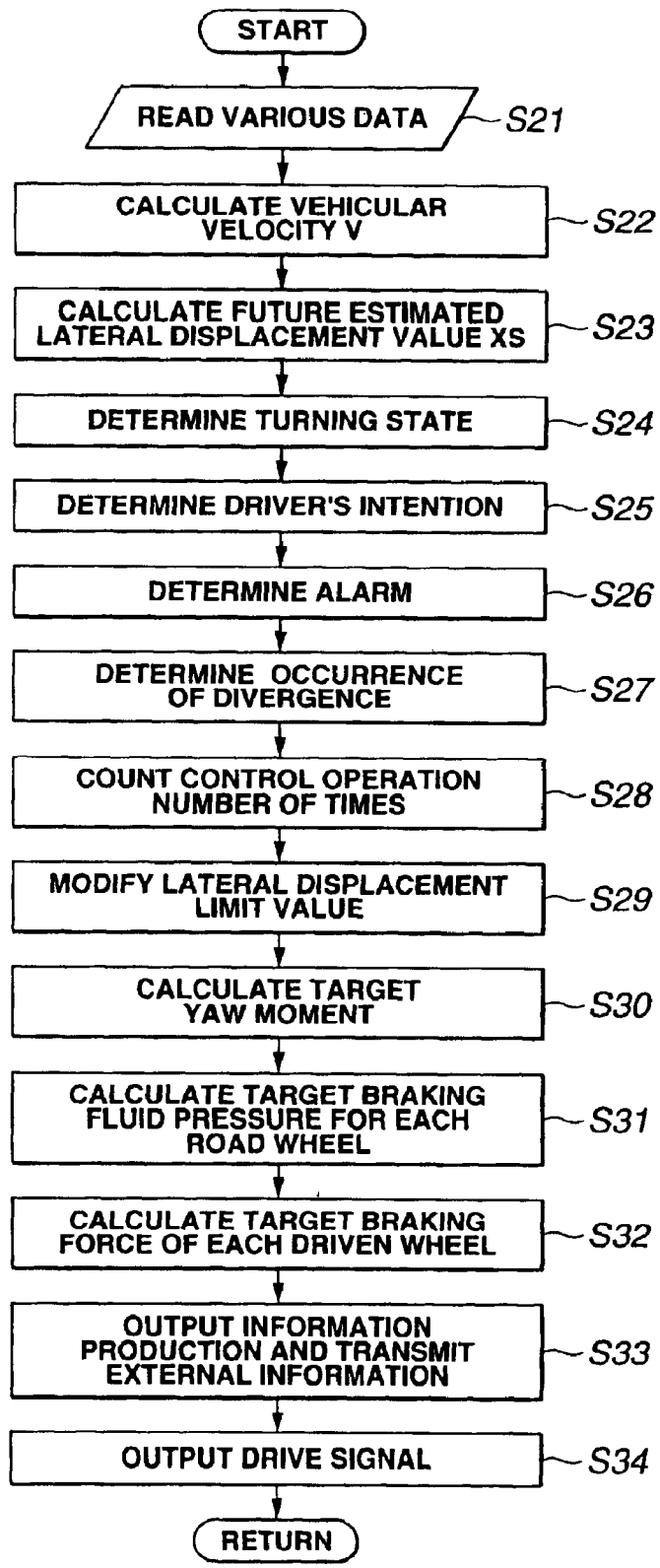
FIG. 9 is an operational flowchart representing an arithmetic processing executed in the braking/driving force controller in the third embodiment shown in FIG. 8.

This arithmetic processing shown in FIG. 9 is executed for each predetermined sampling time ΔT, for example, 10 milliseconds as a timer interrupt routine. It is noted that, although no step to carry out communications to other controllers is provided, the information obtained from the arithmetic processing is temporarily stored in the memory and the necessary information is read temporarily from the memory.

In the arithmetic processing carried out by braking/driving force controller 8, at a step S21, braking/driving force controller 8 reads various data from respective sensors and controllers in the same manner as the first embodiment. At a step S22, braking/driving force controller 8 calculates traveling velocity V of the vehicle from an average value of front left and right road wheel velocities $Vw_{FL}$ and $Vw_{FR}$ read at step S21 in the same manner as described in the first embodiment.

At the next step S23, braking/driving force controller 8 calculates future estimated lateral displacement XS as the divergence estimated value in the same way as described in the first embodiment.

At the next step S24, braking/driving force controller 8 determines whether the vehicle is turning at a quick pace. If braking/driving force controller 8 determines that the vehicle is turning at the quick pace, braking/driving force controller 8 sets a vehicular instability flag $F_{CS}$. If not turning at the quick pace, vehicular instability flag $F_{CS}$ is reset.

The routine goes to a step S25. In the same way as described in the first embodiment, braking/driving force controller 8 determines whether the driver has the intention to change the traffic lane. If braking/driving force controller 8 determines that the intentional traffic lane change occurs, braking/driving force controller 8 sets traffic lane change flag $F_{LC}$. If not so, braking/driving force controller 8 resets traffic lane change determination flag $F_{LC}$.

At the next step S26, braking/driving force controller 8 determines whether the vehicle has the tendency of diverging the vehicle from the traffic lane in the same manner as the first embodiment. It is noted that since, in the third embodiment, lateral displacement limit value Xc is set to be smaller whenever the lane keep control is executed, braking/driving force controller 8 determines whether the warning is issued using lateral displacement limit value Xc.

At the next step S27, braking/driving force controller 8 determines whether the vehicle has the tendency of diverging from the traffic lane in the same way as described in the first embodiment. It is noted that, in the third embodiment, lateral displacement limit value Xc as will be described later is set to be smaller whenever the lane keep control is executed. Hence, braking/driving force controller 8 determines that the vehicle has the tendency of diverging from the traffic lane when absolute value |XS| of future estimated lateral displacement as the divergence estimated value calculated at step S23 is equal to or larger than lateral displacement limit value Xc and sets divergence determination flag $F_{LD}$. Otherwise, braking/driving force controller 8 resets divergence determination flag $F_{LD}$ determining that the vehicle has no tendency of divergence from the traffic lane. Furthermore, in the same manner as described in the first embodiment, when vehicle instability flag $F_{US}$ set at step S24 is in the set state, or when traffic lane change determination flag $F_{LC}$ set at step S25 is set, no lane keep control is executed. Hence, in these cases, divergence determination flag $F_{LD}$ is reset even if absolute value |XS| of future estimated lateral displacement is equal to or larger than lateral displacement limit value Xc.

At the next step S28, braking/driving force controller 8 counts the number of times the lane keep control is executed. Specifically, if divergence determination flag $F_{LD}$ is again set within a predetermined time Tc from a timing at which divergence determination flag $F_{LD}$ is reset at step S27, a lane keep control execution number of times counter Cs is incremented by one. While divergence determination flag $F_{LD}$ is set, lane keep control execution number of times counter Cs is not incremented. In addition, lane keep control number of times counter Cs is cleared after a predetermined period of time Tc has passed from a time at which the divergence determination flag $F_{LD}$ is previously reset.

Figure 10:
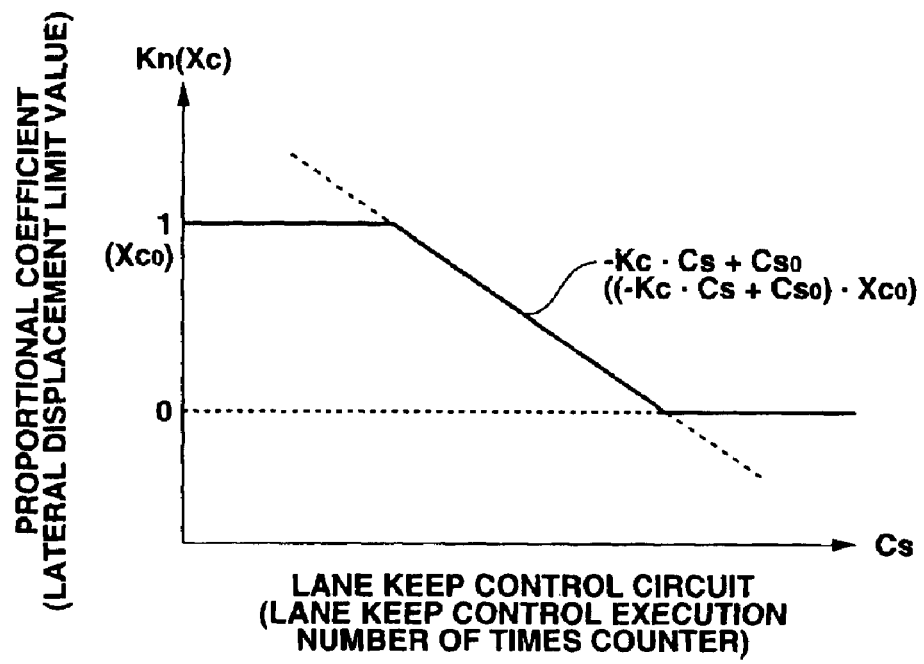
FIG. 10 is a control map used in the arithmetic processing shown in FIG. 9.
Figure 11A:
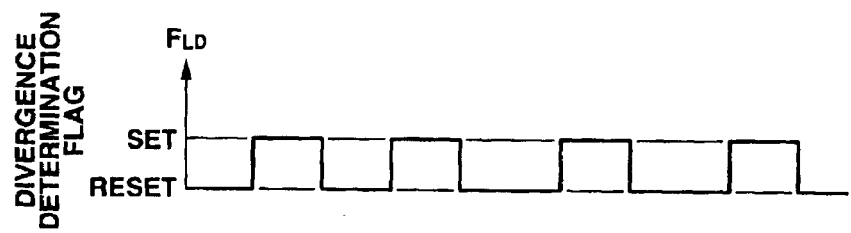
FIGS. 11A, 11B, 11C, and 11D are integrally timing charts for explaining an action of the vehicle as the result of the arithmetic processing shown in FIG. 8.
Figure 11B:
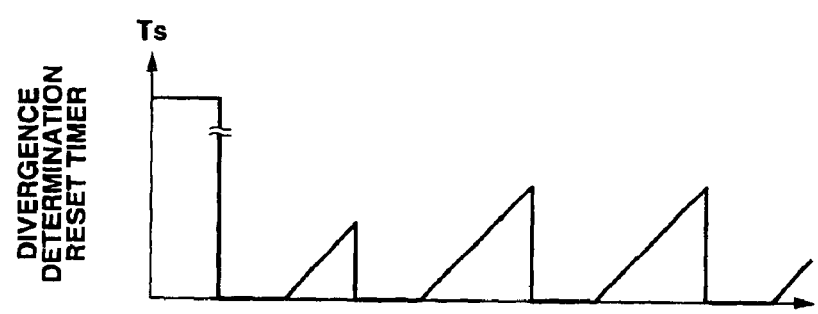
Figure 11C:
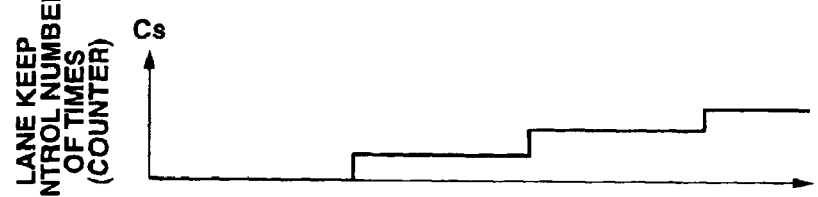
Figure 11D:
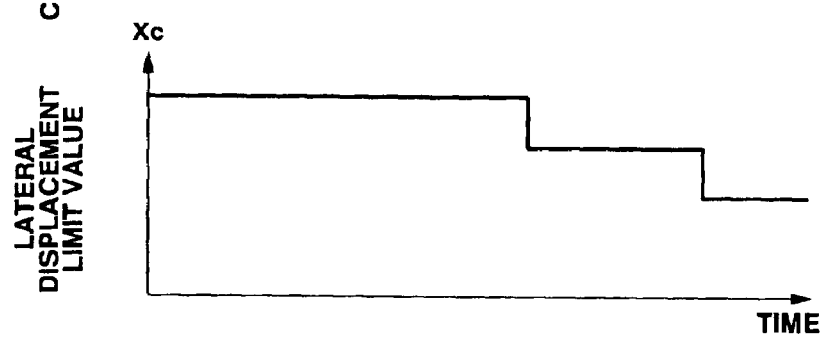

At the next step S29, braking/driving force controller 8 performs the change in lateral displacement limit value Xc. Specifically, braking/driving force controller 8 sets proportional coefficient Kn which is gradually decreased together with the increase in lane keep control number of times counter Cs. This proportional coefficient Kn includes a value on the straight line which is decreased together with the increment in lane keep control execution number of times counter Cs with an intercept $Cs_0$ and a gradient of −Kc when lane keep control number of times counter Cs is at "0" and an intermediate value between maximum value of "1" and minimum value of "0", as shown in FIG. 10. On the other hand, in the same manner as the first embodiment, a value of the half value of width $L_0$ of the vehicle subtracted from a half value of width L of the traffic lane provides lateral displacement limit value initial value $Xc_0$. A value of lateral displacement limit value initial value $Xc_0$ multiplied by proportional coefficient Kn provides lateral displacement limit value Xc. Hence, lateral displacement limit value Xc is also gradually decreased as the increase in lane keep control execution number of times counter Cs with lateral displacement limit value initial value $X_{c0}$ as a maximum initial value, in the same manner as proportional coefficient Kn shown in FIG. 10.

The routine goes to a step S30. At step S30, braking/driving force controller 8 calculates and sets target yaw moment in the same way as described in the first embodiment. Target yaw moment Ms is set only when the divergence determination flag $F_{LD}$ is set. Target yaw moment Ms is calculated in accordance with proportional coefficient $K_1$ determined from vehicular specifications, proportional coefficient $K_2$ determined from set in accordance with vehicular traveling speed V shown in FIG. 4, future estimated lateral displacement XS calculated at step S23, and lateral displacement limit value Xc set at step S29. It is noted that target yaw moment Ms is at a "0" when divergence determination flag $F_{LD}$ is reset.

At the next step S31, braking/driving force controller 8 calculates target brake fluid pressure Psi for each road wheel in the same way as described in the first embodiment.

At the next step S32, braking/driving force controller 8 calculates target driving force of the driven wheels in the same way as described in the first embodiment.

At the next step S33, braking/driving force controller 8 performs the information producing output for the in-vehicle information producing device 23 on the contents of lane keep control and external information transmission by means of external vehicle information producing device 24. In this embodiment, the content of the information is modified as follows in accordance with a magnitude of the lane keep control execution number of times counter Cs. That is to say, with divergence determination flag $F_{LD}$ set, lane keep control execution number of times counter Cs is equal to or smaller than the predetermined value. At this time, in-vehicle information producing device 23 produces a first warning content and does not carry the external information transmission through external vehicle displaying device 24. The first control content is such a message as follows: The lane keep control is continuously carried out. Please return to a normal operation immediately now. In addition, with divergence determination flag $F_{LD}$ set and lane keep control execution number of times counter Cs is equal to or larger than the predetermined value, the vehicular information producing device 23 produces the second content of warning. By means of the external vehicle information producing device 24 automatically informs, for example, an emergency communication party to the effect that the lane keep control is continued. The second warning content is, for example, since the lane keep control is still continuously operated, an emergency warning is issued.

It is noted that, with divergence determination flag $F_{LD}$ not reset, no information producing is carried out.

At the step S34, braking/driving force controller 8 outputs target brake fluid pressure of each road wheel calculated at step S31 to brake fluid pressure control circuit 7 brake fluid pressure control circuit 7 and outputs target drive torque of the driven wheels calculated at step S32 to drive torque controller 12 and the routine returns to the main program.

According to the arithmetic processing shown in FIG. 9 in the third embodiment, braking/driving force controller 8 determines that the vehicle has the tendency of diverging from the traffic lane on which the vehicle is traveling when the vehicle is not turned quickly, no intentional traffic lane change occurs, and future estimated lateral displacement XS is equal to or larger than lateral displacement limit value Xc and sets divergence determination flag $F_{LD}$. On the basis of the difference between future estimated lateral displacement XS and lateral displacement limit value Xc, braking/driving force controller 8 controls the brake force of each road wheel so as to achieve target yaw moment Ms. If, for example, the steering input is small, the yaw moment is developed on the vehicle which keeps the vehicle run on the traffic lane, and the brake force causes the vehicle to be decelerated. Therefore, a more safe prevention of the vehicle from the divergence from the traffic lane can be achieved. In this embodiment, while the lane keep control is carried out, the output torque of engine 9 is reduced and the traveling velocity V of the vehicle is reduced. Thus, a furthermore safe driving on the traffic lane can be achieved.

In this embodiment, count value of lane keep control number of times counter Cs becomes increased with the lane keep control repeated within the predetermined period of time Tc, namely, a frequency at which the lane keep control is started becomes high. At this time, lateral displacement limit value Xc becomes gradually small. Consequently, target yaw moment Ms is gradually enlarged. FIGS. 11A through 11D show aging variations between lane keep control number of times counter Cs when the vehicle repeats the traffic lane divergence tendency and lateral displacement limit value Xc. In FIGS. 11A through 11D, Ts denotes a divergence reset timer incremented when a divergence determination flag is reset. In the way described above, the tendency of the vehicle to diverge from the traffic lane is repeated so that target yaw moment Ms is gradually increased. For example, in the same way as described in the first embodiment, the vehicle is tried to be returned to the center of the traffic lane as the time has passed. Consequently, it becomes possible to achieve the lane keep control such that the divergence of the vehicle from the traffic lane is prevented from occurring.

Figure 12:
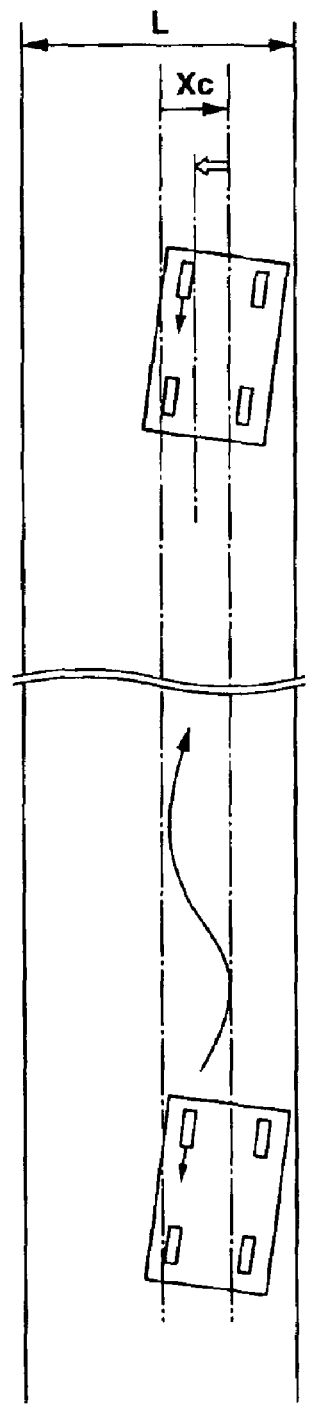
FIG. 12 is an explanatory view for explaining an action of the arithmetic processing shown in FIG. 8.

In addition, as a result of a repetition of the divergence tendency of the vehicle from the traffic lane as described above, lateral displacement limit value Xc which provides a threshold value to determine the occurrence of divergence. FIG. 12 shows a state in which lateral displacement limit value Xc becomes small, as the result of the repetition of the divergence tendency of the vehicle. In this way, the frequency of the vehicular tendency from the traffic lane is repeated, namely, as the frequency of lane keep control becomes large, lateral displacement limit value Xc which serves to provide the threshold value of divergence determination becomes small. Accordingly, the timing at which the divergence tendency determination is made becomes earlier so that more accurate and speedily avoidance of the vehicular divergence tendency can be achieved.

In this embodiment, since the content of the information production to an internal or external of the vehicle is modified according to a magnitude of the lane keep control execution number of times counter Cs, viz., the frequency of the execution of the lane keep control, it becomes possible to produce the information of the content to which a more careful attention should be paid to the internal or external to the vehicle.

As described above, each sensor shown in FIG. 8, camera controller 14, and step S21 shown in the arithmetic processing shown in FIG. 9 constitute the traveling state detecting means (section) in the third embodiment according to the present invention. Step S27 of the arithmetic processing shown in FIG. 9 constitutes divergence determining means (section). Steps S31 and S32 constitute braking/driving force controlled variable calculating means (section). Brake fluid pressure control circuit 7 shown in FIG. 8 and drive torque controller 12 constitute braking/driving force controlling means (section). Steps S28 through S30 shown in FIG. 9 constitute braking/driving force controlled variable correcting means (section). In-vehicle information producing device 24 shown in FIG. 8 constitutes in-vehicle information producing means (section). Step S33 shown in FIG. 9 constitutes warning means (section).

Next, a fourth preferred embodiment of the lane keep control apparatus according to the present invention will be described below. The rough configuration of the fourth embodiment is generally the same as that shown in FIG. 8 of the third embodiment. In the fourth embodiment, the arithmetic processing executed in braking/driving force controller 8 is changed from FIG. 9 executed in the third embodiment to FIG. 13 executed in this embodiment.

Figure 13:
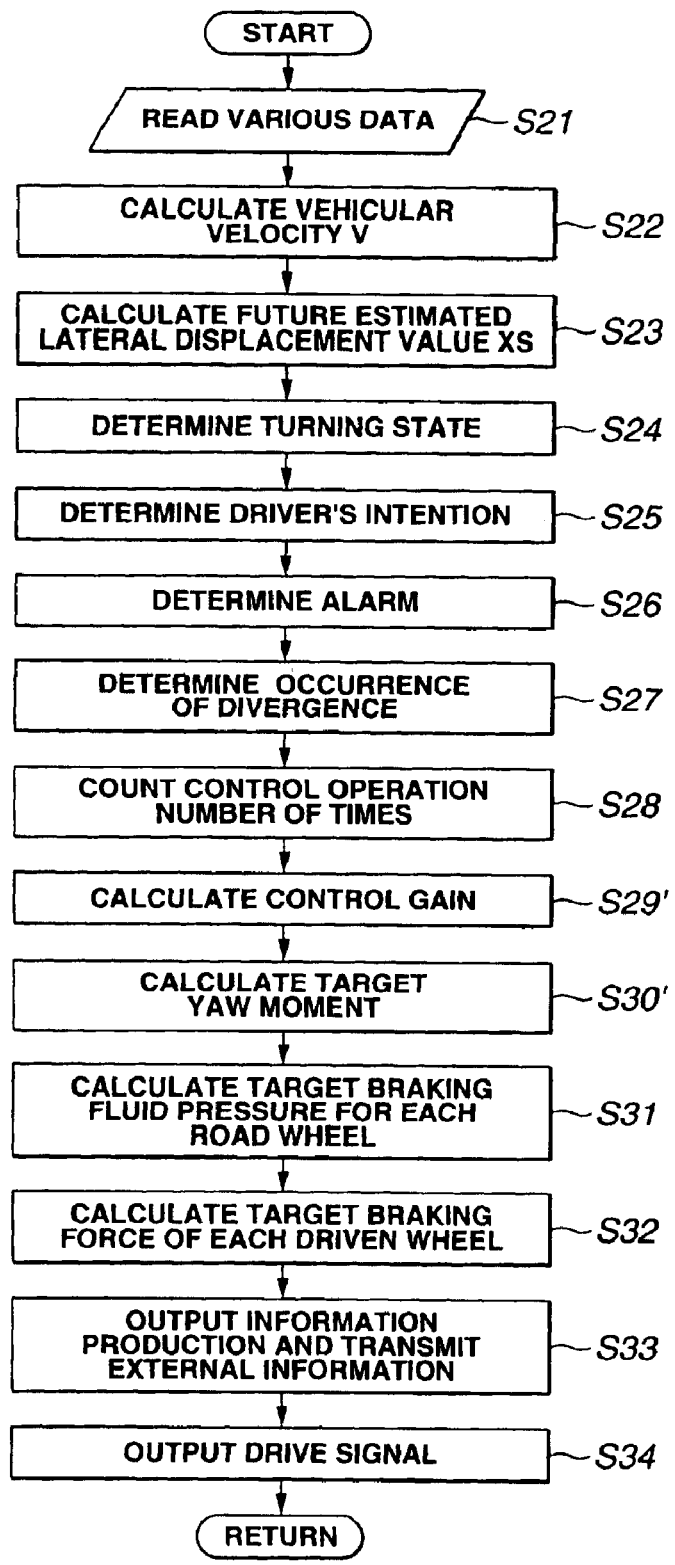
FIG. 13 is an operational flowchart for explaining a fourth preferred embodiment of the lane keep control apparatus according to the present invention.
Figure 14:
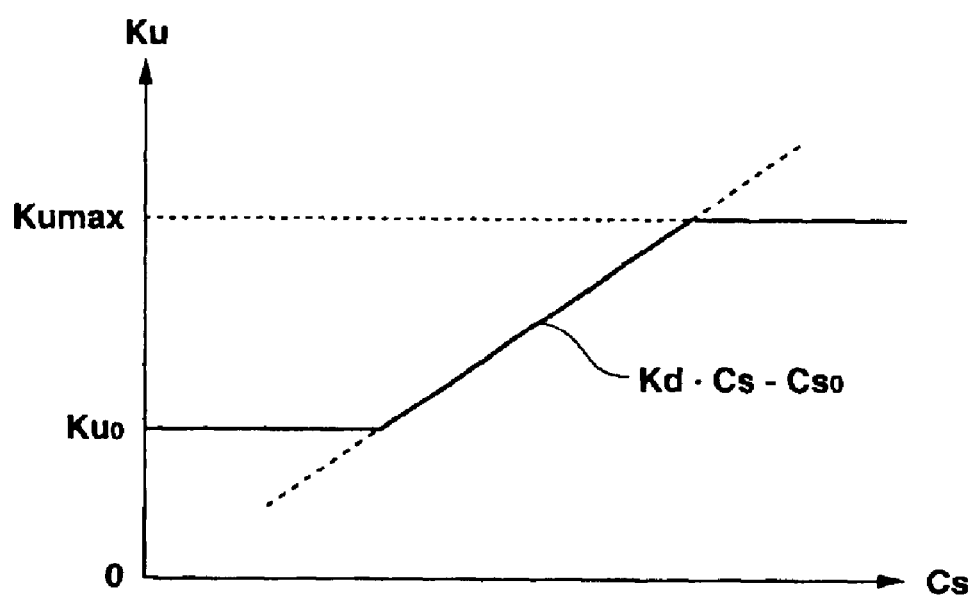
FIG. 14 is a control map used in the arithmetic processing shown in FIG. 13.

The same numbered steps shown in FIG. 13 as those shown in FIG. 9 have the same contents and the detailed explanation thereof will herein be omitted.

In the arithmetic processing shown in FIG. 13, step S29 shown in FIG. 9 is changed to step S29' shown in FIG. 13 and step S30 shown in FIG. 9 is changed to step S30' in FIG. 13.

It is noted that since, in the fourth embodiment, lateral displacement limit value Xc is not changed, lateral displacement limit value initial value $Xc_0$ described in the third embodiment is directly used as lateral displacement limit value Xc.

At step S29' shown in FIG. 13, braking/driving force controller 8 calculates a control gain Ku used for the calculation of target yaw moment Ms. Control gain Ku includes a value on a straight line having an intercept of $-Cs_0$ when lane keep control execution number of times counter Cs is at "0" and a gradient of Kd and which is increased as the content of lane keep control execution number of times counter Cs is increased and an intermediate value between a maximum value $Ku_{MAX}$ and a minimum value $Ku_0$.

At step S30', braking/driving force controller 8 calculates target yaw moment Ms. Specifically, braking/driving force controller 8 multiplies target yaw moment calculated as described in the third embodiment with control gain of Ku to provide a new target yaw moment Ms. Target yaw moment Ms is set only when divergence determination flag $F_{LD}$ is set in the same way as described in the third embodiment. Hence, braking/driving force controller 8 calculates target yaw moment Ms in accordance with equation (8) using control gain Ku calculated at step S29', proportional coefficient $K_1$ determined from vehicular specifications, proportional coefficient $K_2$ set in accordance with vehicular travel velocity V shown in FIG. 4, future lateral displacement XS calculated at step S23, and lateral displacement limit value Xc when divergence determination flag $F_{LD}$ is set. It is noted that when divergence determination flag $F_{LD}$ is reset, braking/driving force controller 8 turns target yaw moment Ms to "0".

According to the arithmetic processing shown in FIG. 13, braking/driving force controller 8 sets divergence determination flag $F_{LD}$ determining that the vehicle tends to be diverged from the traffic lane when the vehicle is not in the abrupt turning state, no intentional traffic lane change of the driver occurs, and future estimated lateral displacement XS is equal to or larger than the lateral displacement limit value Xc, calculates target yaw moment Ms on the basis of the difference between the future estimated lateral displacement XS and lateral displacement limit value Xc, and controls the braking force of each road wheel so as to achieve target yaw moment Ms. Thus, since the vehicular divergence from the traffic lane can be prevented due to the development of the yaw moment preventing the traffic lane divergence when the steering input, for example, is small. Since the traveling velocity is decreased due to the braking force, a more safe divergence of the vehicle from the traffic lane can be prevented from occurring. Since, in the fourth embodiment, while the lane keep control is executed, the output torque of the engine is reduced so that the traveling velocity of the vehicle is decreased. Furthermore, a more safe divergence of the vehicle from the traffic lane can be possible.

When, in the fourth embodiment, the lane keep control is repeated within predetermined period of time Tc so that the count value of the lane keep control execution number of times counter Cs indicates large, viz., the frequency of the starting of the lane keep control becomes high, and control gain Ku is gradually large. Consequently, since target yaw moment Ms is gradually increased, it becomes possible to prevent the vehicle from diverging from the traffic lane by returning the vehicle to the center of the traffic lane as the time has passed, in the same manner as described in the third embodiment.

In addition, since, if the vehicle repeats the tendency of the vehicular divergence from the traffic lane as described before, lateral displacement limit value Xc which is the threshold value of the vehicular divergence determination becomes small. Accordingly, a timing at which the determination on the tendency of the vehicular divergence from the traffic lane becomes earlier and more accurate and speedy avoidance of the vehicular divergence from the traffic lane can be achieved.

Since, also in this embodiment, the content of the information production to the internal or external of the vehicle is modified according to the count value of the lane keep control execution number of times counter Cs, viz., the frequency of the lane keep control execution, the information on the content to which the more careful attention should be paid can be produced to the internal or external to the vehicle when the frequency of the lane keep control execution is high.

In the fourth embodiment, each sensor shown in FIG. 8, camera controller 14, and step S21 shown in the arithmetic processing shown in FIG. 13 constitute traveling state detecting means (section), step S27 shown in FIG. 13 constitutes divergence determining means (section), steps S31 and S32 shown in FIG. 13 constitute braking/driving force controlled variable calculating means (section), brake fluid pressure control circuit 7 and drive torque controller 12 constitute brake/drive force controlling means (section), steps S28 through S30' constitute braking/driving force controlled variable correcting means (section), in-vehicle information production device 23 in FIG. 8 constitutes the in-vehicle information producing means (section), external vehicle information producing device 24 in FIG. 8 constitute external vehicle information producing means (section), and step S33 shown in FIG. 13 constitutes warning means (section).

Next, a fifth embodiment of the lane keep control apparatus according to the present invention will be described below.

The rough configuration of the vehicle in the fifth embodiment is generally the same as that shown in FIG. 8 of the third embodiment. In the fifth embodiment, the arithmetic processing carried out in the braking/driving force controller 8 is changed from FIG. 9 concerned with the third embodiment to FIG. 15 concerned with the fifth embodiment.

Figure 15:
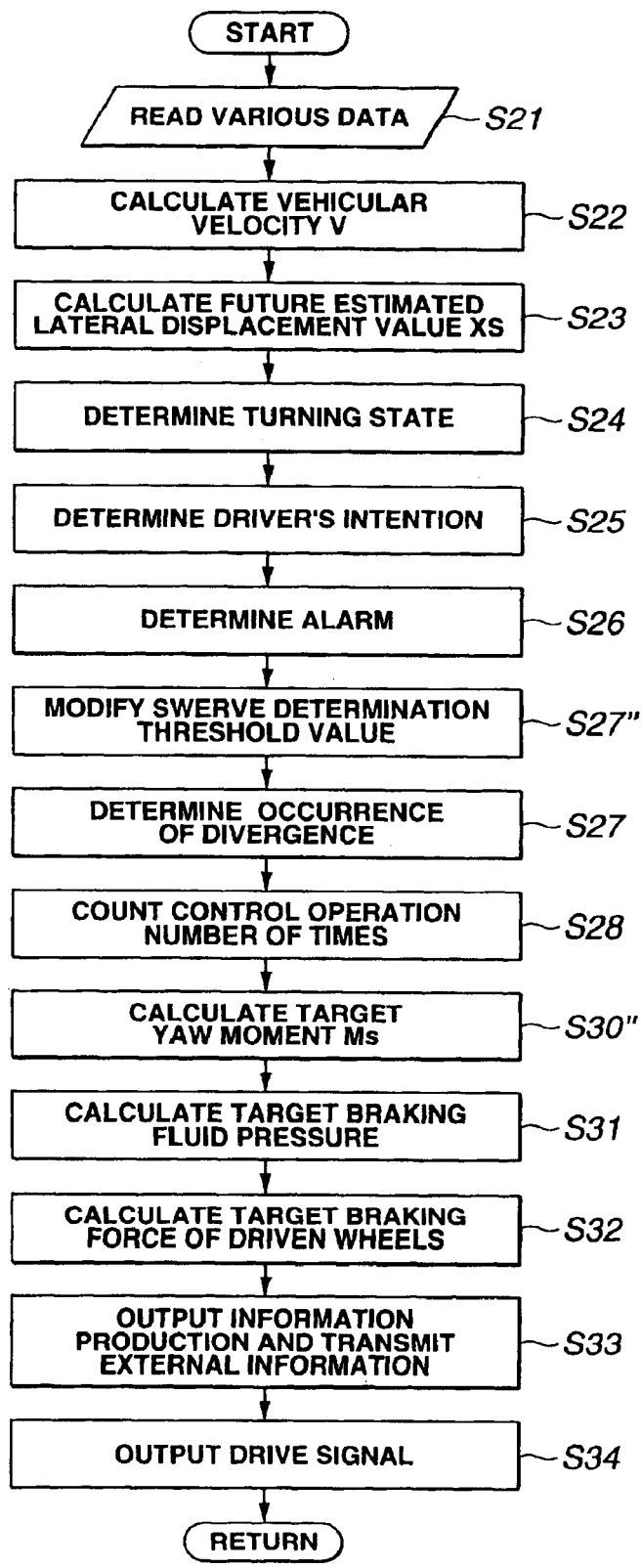
FIG. 15 is an operational flowchart executed in the braking/driving force controller in a fifth preferred embodiment of the lane keep control apparatus according to the present invention shown in FIG. 8.

The arithmetic processing shown in FIG. 15 includes many of the same steps as those described in the third embodiment shown in FIG. 8. The detailed explanation of the same numbered steps as those shown in FIG. 9 will herein be omitted.

In the fifth embodiment, in the arithmetic processing executed in braking/driving force controller 8, the flowchart of FIG. 9 is changed to that shown in FIG. 15.

A new step S27" shown in FIG. 15 is interposed before step S27 shown in FIG. 9 and step S30 shown in FIG. 9 is changed from step S30" shown in FIG. 15.

That is to say, at step S27", braking/driving force controller 8 modifies lateral displacement limit value Xc as the divergence determination threshold value.

Figure 16:
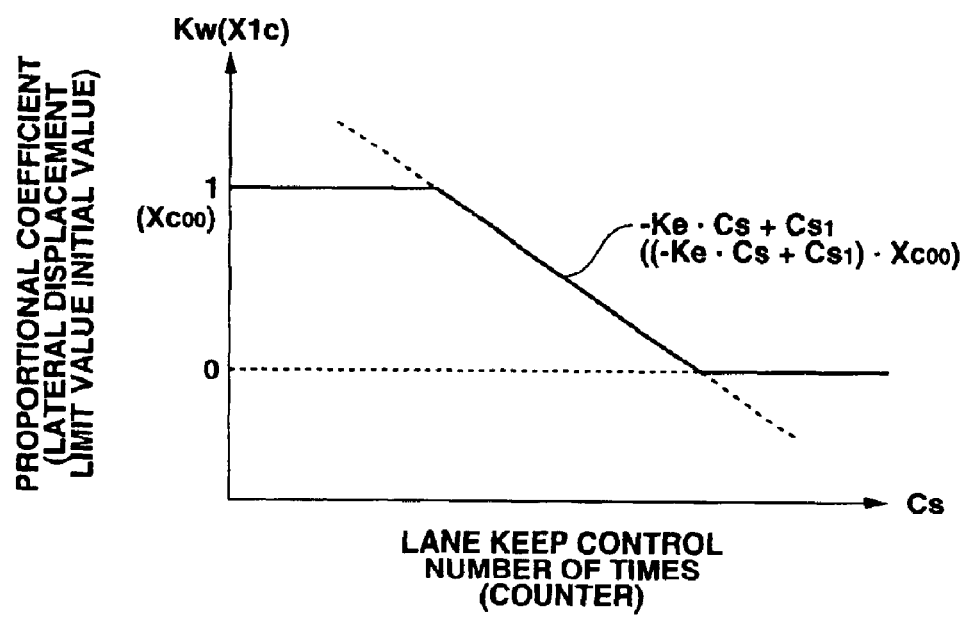
FIG. 16 is a control map used in the arithmetic processing shown in FIG. 15.

In the fifth embodiment, lateral displacement limit value Xc is not directly modified but lateral displacement limit value initial value Xc0 required for the calculation of lateral displacement limit value Xc is modified. Specifically, braking/driving force controller 8 sets a proportional coefficient Kw which is gradually decreased together with an increment in lane keep control number of times counter Cs. Proportional coefficient Kw includes a value on the straight line having an intercept of $Cs_1$ when lane keep control execution number of times counter Cs indicates "0", having a gradient of –Ke, and which is decreased together with the increment in lane keep control execution number of times counter Cs indicates "0", as shown in FIG. 16, and an intermediate value between maximum value of "1" and minimum value of "0". On the other hand, in the same manner as described in the first embodiment, a value of the half value of vehicular width $L_0$ of the vehicle subtracted from the half value of width L of the corresponding traffic lane on which the vehicle is running is set as lateral displacement limit value initial value $Xc_{00}$. Then, the value of the multiplication of lateral displacement limit value initial value $Xc_0$ with proportional coefficient Kw provides a new lateral displacement limit value initial value $Xc_0$. Hence, with lateral displacement limit value initial value $Xc_0$ is gradually decreased together with the increase in lane keep control execution number of times counter Cs with the lateral displacement limit value initial value $Xc_0$ as a maximum initial value in the same manner as proportional coefficient Kw shown in FIG. 16.

At step S30", braking/driving force controller 8 uses lateral displacement limit value initial value Xc0 set at step S27" directly as lateral displacement limit value Xc. When divergence determination flag $F_{LD}$ is set, braking/driving force controller 8 calculates target yaw moment Ms in accordance with equation (2) using proportional coefficient K1 determined from the vehicular specification, proportional coefficient $K_2$ set in accordance with the vehicular traveling velocity V shown in FIG. 4, and future estimated lateral displacement XS calculated at step S23. It is noted that, when divergence determination flag $F_{LD}$ is reset, target yaw moment Ms is set to be "0".

In the arithmetic processing shown in FIG. 13, braking/driving force controller 8 determines that the vehicle has the tendency of diverging from the traffic lane when the vehicle is not in the abrupt turning state, no intentional traffic lane change of the driver occurs, and future estimated lateral displacement XS is equal to or larger than lateral displacement limit value Xc, sets divergence determination flag $F_{LD}$, calculates target yaw moment Ms on the basis of a difference between future estimated lateral displacement XS and lateral displacement limit value Xc, and controls the braking force of each road wheel so as to achieve target yaw moment Ms. Thus, when, for example, the steering input is small, the yaw moment to prevent the vehicle from being diverged from the traffic lane is developed and the vehicular traveling speed due to the braking force is decreased. Hence, a more safe prevention of the vehicle from being diverged from the traffic lane can be achieved.

If, in the fifth embodiment, the lane keep control is repeated within the predetermined period of time Tc and the count value of the lane keep control execution number of times counter Cs becomes large, viz., the frequency of the lane keep control execution start becomes large, lateral displacement limit value initial value $Xc_0$ which is the lateral displacement limit value Xc becomes gradually reduced. Consequently, target yaw moment Ms is gradually enlarged. Hence, in the same way as described in the third embodiment, it becomes possible to prevent the vehicle from being diverged from the traffic lane by returning the vehicle from the center of the traffic lane as the time has passed in the same way as described in the third embodiment.

As described above, since the repetition of the vehicle in the vehicular divergence tendency from the traffic lane causes lateral displacement limit value initial value $Xc_0$ which is the threshold value on the divergence determination to be small, correspondingly, the timing at which the determination of the tendency of the vehicular divergence from the traffic lane is carried out becomes earlier. Hence, more accurate and speedily avoidance of the vehicular divergence from the traffic lane can be avoided.

As described above, each sensor shown in FIG. 8, camera controller 14 shown in FIG. 8, and step S21 of the arithmetic processing shown in FIG. 15 constitutes travel state detecting means (section). Step S27 of the arithmetic processing shown in FIG. 15 constitutes divergence determining means (section). Steps S31 and S32 in the arithmetic processing shown in FIG. 15 constitute braking/driving (driving) force controlled variable calculating means (section). Brake fluid pressure control circuit 7 shown in FIG. 8 and drive torque controller 12 constitute braking/driving (driving) force controlling means (section). Step S27" in the arithmetic processing shown in FIG. 15 and steps S28 through S30" constitute braking/driving force (driving force) controlled variable correcting means (section). The in-vehicle information producing device 23 shown in FIG. 8 constitutes the in-vehicle information producing means (section). External vehicle information producing device 24 shown in FIG. 8 constitutes external vehicle information producing means (section). Step S33 in the arithmetic processing shown in FIG. 15 constitutes warning means (section).

It is noted that, although, in the fifth embodiment, predetermined time Tc to increment lane keep control number of times counter Cs is a fixed value, predetermined time Tc may be set to be shorter, for example, in accordance with the traveling velocity V of the vehicle. In addition, since the subsequent tendency of the vehicular divergence from the traffic lane has, in general, a high possibility of being repeated when the tendency of the vehicular divergence from the traffic lane is once repeated, predetermined time Tc may be decreased together with the increase in the lane keep control number of times counter Cs.

In addition, since although, in the fifth embodiment, a road-to-vehicle communication is used to communicate with an emergency communicator as external vehicle information producing device, the external vehicle information producing means (section) according to the present invention may produce the information to an outside of the vehicle using a blink of a hazard lamp or a light turn on of headlights since the content of the vehicular tendency of divergence from the traffic lane may be produced by the external vehicle information producing means (section).

In the first embodiment, lateral displacement limit value initial value $Xc_0$ which provides the threshold value of traffic lane divergence determination is calculated from width of the vehicle and width of the traffic lane. However, for example, since the width of the traffic lane in a Japanese express highway is already determined to be 3.35 meters, lateral displacement limit value initial value, for example, may be fixed to 0.8 meters.

It is noted that a term of a driving force used in the claims includes the meaning of a braking force since the driving force is positive with respect to the direction that the vehicle is forwarded and the braking force is negative with respect to the direction that the vehicle is forwarded. It is also noted that a phrase of control executed to avoid the divergence of the vehicle from the traffic lane described in the claims has the same meaning of the lane keep control.

The entire contents of a Japanese Patent Application No. 2001-304138 (filed in Japan on Sep. 28, 2001) are herein incorporated by reference. Modifications and variations of the embodiments described above will occur to those skilled in the art in the light of the above teachings. The scope of the invention is defined with reference to the following claims.

INDUSTRIAL APPLICABILITY

The present invention is applicable to an automotive vehicle. The present invention is concerned with lane keep control apparatus and method in which a travel state detecting section detects a travel state of the vehicle, a divergence tendency determining section determines whether there is a tendency of a divergence of the vehicle from a traffic lane on which the vehicle is traveling according to the travel state detected by the travel state detecting section, a driving force controlled variable calculating section calculates a driving force controlled variable for each road wheel to develop a yaw moment in a direction in which the divergence of the vehicle from the traffic lane is avoided in accordance with the travel state detected by the travel state detecting section, the driving force controlled variable calculating section comprising a driving force controlled variable correcting section that corrects the driving force controlled variable of each road wheel in such a manner that the yaw moment developed in a direction in which the divergence of the vehicle from the traffic lane is avoided is increased in accordance with a history of a control executed to avoid the divergence of the vehicle from the traffic lane, and a driving force controlling section controls a driving force of each road wheel in accordance with the driving force controlled variable calculated by the driving force controlled variable calculating section.

What is claimed is:

1. A lane keep control apparatus for an automotive vehicle, comprising:
   a travel state detecting section that detects a travel state of the vehicle;
   a divergence tendency determining section that determines whether a tendency of a divergence of the vehicle from a traffic lane on which the vehicle is traveling occurs according to the travel state detected by the travel state detecting section;
   a driving force controlled variable calculating section that calculates a driving force controlled variable for each road wheel to develop a yaw moment in a direction in which the divergence of the vehicle from the traffic lane is avoided in accordance with the travel state detected by the travel state detecting section, the driving force controlled variable calculating section comprising a driving force controlled variable correcting section that corrects the driving force controlled variable of each road wheel in such a manner that the yaw moment developed in the direction in which the divergence of the vehicle from the traffic lane is avoided is increased in accordance with a history of a control executed to avoid the divergence of the vehicle from the traffic lane; and
   a driving force controlling section that controls a driving force of each road wheel in accordance with the driving force controlled variable calculated by the driving force controlled variable calculating section.

2. A lane keep control apparatus for an automotive vehicle as claimed in claim 1, wherein the lane keep control apparatus further comprises: an in-vehicle information producing section that produces the information to a vehicular occupant in a vocal form or in a display form; and a warning section that produces the information from the in-vehicle information producing section to a vehicular occupant when the divergence determining section determines that the tendency of the divergence of the vehicle from the traffic lane occurs, the warning section modifying the content of the information to the vehicular occupant in accordance with a frequency of execution of the control to avoid the divergence of the vehicle from the traffic lane.

3. A lane keep control apparatus for an automotive vehicle as claimed in claim 1, wherein the lane keep control apparatus further comprises: an external vehicle information producing section that produces the information to an external to the vehicle; and a warning section that produces the information from the external vehicle information producing section to the external to the vehicle when the divergence determining section determines that the tendency of the divergence of the vehicle from the traffic lane occurs, the warning section modifying the content of the information production to the external to the vehicle in accordance with a frequency of execution of the control to avoid the divergence of the vehicle from the traffic lane.

4. A lane keep control apparatus for an automotive vehicle, comprising:
   a travel state detecting section that detects a travel state of the vehicle;
   a divergence tendency determining section that determines whether a tendency of a divergence of the vehicle from a traffic lane on which the vehicle is traveling occurs according to the travel state detected by the travel state detecting section;
   a driving force controlled variable calculating section that calculates a driving force controlled variable for each road wheel to develop a yaw moment in a direction in which the divergence of the vehicle from the traffic lane is avoided in accordance with the travel state detected by the travel state detecting section, the driving force controlled variable calculating section comprising a driving force controlled variable correcting section that corrects the driving force controlled variable of each road wheel in such a manner that the yaw moment developed in the direction in which the divergence of the vehicle from the traffic lane is avoided is increased in accordance with a history of a control executed to avoid the divergence of the vehicle from the traffic lane; and
   a driving force controlling section that controls a driving force of each road wheel in accordance with the driving force controlled variable calculated by the driving force controlled variable calculating section,
   wherein the driving force controlled variable correcting section corrects the driving force controlled variable in such a manner that the yaw moment developed in the direction in which the divergence of the vehicle from the traffic lane is avoided is increased in accordance with an elapse of time from a time at which the control executed to avoid the divergence of the vehicle from the traffic lane is started.

5. A lane keep control apparatus for an automotive vehicle as claimed in claim 4, wherein the driving force controlling section is enabled to control braking forces of at least left and right road wheels of the vehicle individually and separately from each other.

6. A lane keep control apparatus for an automotive vehicle as claimed in claim 4, wherein the driving force controlled variable calculating section calculates a target yaw moment from a difference between a future estimated lateral displacement of the vehicle with respect to the traffic lane estimated from the travel state of the vehicle detected by the travel state detecting section and a lateral displacement limit value and calculates the driving force controlled variable of each road wheel on the basis of the calculated target yaw moment.

7. A lane keep control apparatus for an automotive vehicle as claimed in claim 6, wherein the driving force controlled variable correcting section reduces the lateral displacement limit value when the target yaw moment is calculated in accordance with the elapse of time from a time at which the control executed to avoid the divergence of the vehicle from the traffic lane is started.

8. A lane keep control apparatus for an automotive vehicle as claimed in claim 6, wherein the driving force controlled variable correcting section augments a control gain to be multiplied with the difference between the future estimated lateral displacement of the vehicle when the target yaw moment is calculated and the lateral displacement limit value.

9. A lane keep control apparatus for an automotive vehicle, comprising:
   a travel state detecting section that detects a travel state of the vehicle;
   a divergence tendency determining section that determines whether a tendency of a divergence of the vehicle from a traffic lane on which the vehicle is traveling occurs according to the travel state detected by the travel state detecting section;
   a driving force controlled variable calculating section that calculates a driving force controlled variable for each road wheel to develop a yaw moment in a direction in which the divergence of the vehicle from the traffic lane is avoided in accordance with the travel state detected by the travel state detecting section, the driving force controlled variable calculating section comprising a driving force controlled variable correcting section that corrects the driving force controlled variable of each road wheel in such a manner that the yaw moment developed in the direction in which the divergence of the vehicle from the traffic lane is avoided is increased in accordance with a history of a control executed to avoid the divergence of the vehicle from the traffic lane; and
   a driving force controlling section that controls a driving force of each road wheel in accordance with the driving force controlled variable calculated by the driving force controlled variable calculating section,
   wherein the driving force controlled variable correcting section corrects the driving force controlled variable of each road wheel of the vehicle in such a manner that the yaw moment developed in the direction in which the divergence of the vehicle from the traffic lane is avoided is increased in accordance with a frequency of the control executed to avoid the divergence of the vehicle from the traffic lane.

10. A lane keep control apparatus for an automotive vehicle as claimed in claim 9, wherein the driving force controlling section is enabled to control at least the driving forces of left and right road wheels individually and separately from each other.

11. A lane keep control apparatus for an automotive vehicle as claimed in claim 9, wherein the driving force controlled variable calculating section calculates a target yaw moment from a difference between a future lateral displacement of the vehicle with respect to the traffic lane estimated from the travel state of the vehicle detected by the travel state detecting section and a lateral displacement limit value and calculates the driving force controlled variable of each road wheel on the basis of the target yaw moment.

12. A lane keep control apparatus for an automotive vehicle as claimed in claim 11, wherein the driving force controlled variable correcting section reduces the lateral displacement limit value when the target yaw moment is calculated in accordance with a frequency of execution of the control to avoid the divergence of the vehicle from the traffic lane.

13. A lane keep control apparatus for an automotive vehicle as claimed in claim 11, wherein the driving force controlled variable correcting section increases a control gain to be multiplied with a difference between the future lateral displacement of the vehicle when the target yaw moment is calculated and the lateral displacement limit value in accordance with a frequency of execution of the control to avoid the divergence of the vehicle from the traffic lane.

14. A lane keep control apparatus for an automotive vehicle as claimed in claim 9, wherein the divergence determining section modifies a timing of the determination of the tendency of the divergence of the vehicle from the traffic lane in accordance with a frequency of execution of the control to avoid the divergence of the vehicle from the traffic lane.

15. A keep control apparatus for an automotive vehicle as claimed in claim 14, wherein the divergence determining section determines that the tendency of the divergence of the vehicle from the traffic lane occurs when the future lateral displacement with respect to the traffic lane estimated from the travel state of the vehicle detected by the travel state detecting section is equal to or larger than the lateral displacement limit value.

16. A lane keep control apparatus for an automotive vehicle as claimed in claim 15, wherein the divergence determining section reduces the lateral displacement limit value in accordance with the frequency of execution of the control to avoid the divergence of the vehicle from the traffic lane to make earlier a timing at which the divergence determining section determines whether the tendency of the divergence of the vehicle from the traffic lane occurs.

17. A lane keep control apparatus for an automotive vehicle, comprising:
   a travel state detecting section that detects a travel state of the vehicle;
   a divergence tendency determining section that determines whether a tendency of a divergence of the vehicle from a traffic lane on which the vehicle is traveling occurs according to the travel state detected by the travel state detecting section;
   a driving force controlled variable calculating section that calculates a driving force controlled variable for each road wheel to develop a yaw moment in a direction in which the divergence of the vehicle from the traffic lane is avoided in accordance with the travel state detected by the travel state detecting section, the driving force controlled variable calculating section comprising a driving force controlled variable correcting section that corrects the driving force controlled variable of each road wheel in such a manner that the yaw moment developed in the direction in which the divergence of the vehicle from the traffic lane is avoided is increased in accordance with a history of a control executed to avoid the divergence of the vehicle from the traffic lane; and a driving force controlling section that controls a driving force of each road wheel in accordance with the driving force controlled variable calculated by the driving force controlled variable calculating section, wherein the driving force controlled variable correcting section corrects the driving force controlled variable in such a manner that the yaw moment developed in the direction in which the divergence of the vehicle from the traffic lane is avoided is increased in accordance with an elapse of time from a time at which the control executed to avoid the divergence of the vehicle from the traffic lane is started, wherein the driving force controlled variable calculating section calculates a target yaw moment from a difference between a future estimated lateral displacement of the vehicle with respect to the traffic lane estimated from the travel state of the vehicle detected by the travel state detecting section and a lateral displacement limit value and calculates the driving force controlled variable of each road wheel on the basis of the calculated target yaw moment, wherein the driving force controlled variable calculating section comprises: a future estimated lateral displacement value calculating section that calculates the future estimated lateral displacement value (XS) as follows: $XS = Tt \times V \times (\phi + Tt \times V \times \beta) + X$, wherein Tt denotes a headway time for calculating a forward gazing distance ($Tt \times V$), V denotes a traveling velocity of the vehicle, $\phi$ denotes a yaw angle of the vehicle to the traffic lane, $\beta$ denotes a radius of curvature of the traffic lane, and X denotes a lateral displacement of the vehicle from a center of the traffic lane; and lateral displacement limit value calculating section that calculates a lateral displacement limit value Xc from a lateral displacement limit value initial value $Xc_0$ which is a subtraction result of a half of a width L of the traffic lane from a half of a width $L_0$ of the vehicle and a proportional coefficient Kt which is decreased as a continuation time Tcc of the control executed to avoid the divergence of the vehicle from the traffic lane is increased and wherein the divergence tendency determining section determines that the divergence of the vehicle from the traffic lane occurs when an absolute value of the future estimated lateral displacement value |XS| is equal to or larger than the lateral displacement limit value Xc.

18. A lane keep control apparatus for an automotive vehicle, comprising:

a travel state detecting section that detects a travel state of the vehicle;

a divergence tendency determining section that determines whether a tendency of a divergence of the vehicle from a traffic lane on which the vehicle is traveling occurs according to the travel state detected by the travel state detecting section;

a driving force controlled variable calculating section that calculates a driving force controlled variable for each road wheel to develop a yaw moment in a direction in which the divergence of the vehicle from the traffic lane is avoided in accordance with the travel state detected by the travel state detecting section, the driving force controlled variable calculating section comprising a driving force controlled variable correcting section that corrects the driving force controlled variable of each road wheel in such a manner that the yaw moment developed in the direction in which the divergence of the vehicle from the traffic lane is avoided is increased in accordance with a history of a control executed to avoid the divergence of the vehicle from the traffic lane; and a driving force controlling section that controls a driving force of each road wheel in accordance with the driving force controlled variable calculated by the driving force controlled variable calculating section, wherein the driving force controlled variable correcting section corrects the driving force controlled variable in such a manner that the yaw moment developed in the direction in which the divergence of the vehicle from the traffic lane is avoided is increased in accordance with an elapse of time from a time at which the control executed to avoid the divergence of the vehicle from the traffic lane is started, wherein the driving force controlled variable calculating section calculates a target yaw moment from a difference between a future estimated lateral displacement of the vehicle with respect to the traffic lane estimated from the travel state of the vehicle detected by the travel state detecting section and a lateral displacement limit value and calculates the driving force controlled variable of each road wheel on the basis of the calculated target yaw moment, wherein the driving force controlled variable calculating section comprises: a future estimated lateral displacement value calculating section that calculates the future estimated lateral displacement value (XS) as follows: $XS = Tt \times V \times (\phi + Tt \times V \times \beta) + X$, wherein Tt denotes a headway time for calculating a forward gazing distance ($Tt \times V$), V denotes a traveling velocity of the vehicle, $\phi$ denotes a yaw angle of the vehicle to the traffic lane, $\beta$ denotes a radius of curvature of the traffic lane, and X denotes a lateral displacement of the vehicle from a center of the traffic lane; and lateral displacement limit value calculating section that calculates a lateral displacement limit value Xc from a lateral displacement limit value initial value $Xc_0$ which is a subtraction result of a half of a width L of the traffic lane from a half of a width $L_0$ of the vehicle and a proportional coefficient Kt which is decreased as a continuation time Tcc of the control executed to avoid the divergence of the vehicle from the traffic lane is increased and wherein the divergence tendency determining section determines that the divergence of the vehicle from the traffic lane occurs when an absolute value of the future estimated lateral displacement value |XS| is equal to or larger than the lateral displacement limit value Xc, wherein the driving force controlled variable correcting section further comprises: a target yaw moment calculating section that calculates a target yaw moment Ms as follows: $Ms = -K_1 \times K_2 \times (XS - Xc)$, wherein $K_1$ denotes a first proportional coefficient determined according to a vehicular specification and $K_2$ denotes a second proportional coefficient set in accordance with the travel velocity V of the vehicle, when the divergence determining section determines that the tendency of the divergence of the vehicle from the traffic lane occurs; and a target brake fluid pressure calculating section that calculates a target brake fluid pressure Psi for each road wheel according to a magnitude |Ms| of the target yaw moment.

19. A lane keep control method for an automotive vehicle, comprising:

detecting a travel state of the vehicle;

determining whether a tendency of a divergence of the vehicle from a traffic lane on which the vehicle is traveling occurs according to the detected travel state;

calculating a driving force controlled variable for each road wheel to develop a yaw moment in a direction in which the divergence of the vehicle from the traffic lane is avoided in accordance with the detected travel state;

correcting the driving force controlled variable of each road wheel in such a manner that the yaw moment developed in the direction in which the divergence of the vehicle from the traffic lane is avoided is increased in accordance with a history of a control executed to avoid the divergence of the vehicle from the traffic lane; and controlling a driving force of each road wheel in accordance with the corrected driving force controlled variable.

20. A lane keep control apparatus for an automotive vehicle, comprising:

travel state detecting means for detecting a travel state of the vehicle;

divergence tendency determining means for determining whether a tendency of a divergence of the vehicle from a traffic lane on which the vehicle is traveling occurs according to the travel state detected by the travel state detecting means;

driving force controlled variable calculating means for calculating a driving force controlled variable for each road wheel to develop a yaw moment in such a direction in which the divergence of the vehicle from the traffic lane is avoided in accordance with the travel state detected by the travel state detecting means, the driving force controlled variable calculating means comprising driving force controlled variable correcting means for correcting the driving force controlled variable of each road wheel in such a manner that the yaw moment developed in the direction in which the divergence of the vehicle from the traffic lane is avoided is increased in accordance with a history of a control executed to avoid the divergence of the vehicle from the traffic lane; and driving force controlling means for controlling a driving force of each road wheel in accordance with the driving force controlled variable calculated by the driving force controlled variable calculating means.

* * * * *